United States Patent [19]
Duren et al.

[11] Patent Number: 5,173,880
[45] Date of Patent: Dec. 22, 1992

[54] METHOD OF GENERATING SEISMIC WAVELETS USING SEISMIC RANGE EQUATION

[75] Inventors: Richard E. Duren, Spring; Carol J. Zimmerman, Houston, both of Tex.

[73] Assignee: Exxon Production Research Company, Houston, Tex.

[21] Appl. No.: 610,467

[22] Filed: Nov. 8, 1990

Related U.S. Application Data

[63] Continuation of Ser. No. 457,261, Dec. 26, 1989, abandoned.

[51] Int. Cl.$^5$ .......................... G01V 1/28; G01V 1/36
[52] U.S. Cl. ........................................ 367/73; 367/21; 367/38; 364/421
[58] Field of Search ...................... 364/73, 421; 367/21, 367/38, 73, 48, 22, 23, 24, 47

[56] References Cited

U.S. PATENT DOCUMENTS

| | | | |
|---|---|---|---|
| 3,008,120 | 11/1961 | Hicks | 367/25 |
| 3,009,527 | 11/1961 | Berryman et al. | 367/73 |
| 3,275,978 | 9/1966 | Shanks | 367/44 |

(List continued on next page.)

OTHER PUBLICATIONS

Yu, Gary, "Offset-Amplitude Variation and Controlled-Amplitude Processing", *Geophysics*, vol. 50, No. 2, 1985, pp. 2697-2708.

Skolnik, M. I., "Introduction to Radar Systems", McGraw Hill Book Company, New York, 1962, pp. 3-5, 570-579.

Waters, K. H., "Reflection Seismology, a Tool for Energy Resource Exploration", John Wiley and Sons, New York, 1981, pp. 27-47, 254-259.

Haslett, R. W. G., "The Quantitative Evaluation of (List continued on next page.)

*Primary Examiner*—Ian J. Lobo
*Attorney, Agent, or Firm*—Vaden, Eickenroht, Thompson & Boulware

[57] ABSTRACT

A method of deterministically computer generating a model of a response voltage waveform of a seismic receiver employed in a seismic, particularly marine, data gathering system, the model incorporating factors that have been identified as significant contributions to amplitude, such as directivity, divergence, attenuation, interbed multiples, and transmissivity. The model is generated from the mathematical manipulation of well log data and data gathering system characteristics into a seismic range equation, namely:

$$E_r(f) = \frac{E(f)D(\theta_s, \phi_s, f)A_c(\theta_H, \phi_H, f)R_T^2}{D_v L(f)}$$

where $E_r(f)$ = received energy density $E(f)$ = radiated energy density $D(\theta_s, \phi_s, f)$ = source directivity along $\theta_s, \phi_s$ direction at the source $A_c(\theta_H, \phi_H, f)$ = Capture area along $\theta_H, \phi_H$ direction at the hydrophone array $R_T$ = target reflection coefficient $D_v$ = divergence $L(f)$ = other loss factor associated with subsurface and system
= $L_t L_q(f) L_{ib}(f)$
= transmission loss * Q-loss * interbed multiple loss One preferred use of the resulting modeled waveform is in a pre-process comparison with actual seismic data for validating and interpreting such actual data. Another use is in the deconvolution of seismic data for improved resolution.

69 Claims, 17 Drawing Sheets

U.S. PATENT DOCUMENTS

| | | | |
|---|---|---|---|
| 3,409,871 | 11/1968 | Hefring | 367/51 |
| 3,739,328 | 6/1973 | Beil | 367/25 |
| 4,293,933 | 10/1981 | Park et al. | 367/25 |
| 4,314,339 | 2/1982 | Kenyon | 364/422 |
| 4,403,290 | 9/1983 | Clavier et al. | 364/422 |
| 4,649,526 | 3/1987 | Winbow et al. | 367/35 |
| 4,752,916 | 6/1988 | Loewenthal | 367/24 |

OTHER PUBLICATIONS

Echo-Sounder Signals from Fish", *Journal of British Institution for Radio Engineers,* Jul. 1961, pp. 33-40.

Duren, Richard E., "A Theory for Marine Source Arrays", Geophysics, May 1988, pp. 650-655 vol. 53, No. 5.

Barton, David K., *Radar System Analysis,* Prentice-Hall Inc., New Jersey, 1965, pp. 109-138.

O'Doherty, R. F. and Ansley, N. A., "Reflections on Amplitudes", *Geophysical Prospecting,* vol. 19, 1971, pp. 430-458.

Newman, P., "Divergence Effects in a Layered Earth", Geophysics, vol. 38, No. 3, 1973, pp. 481-487.

Koefoed, O., "Reflection and Transmission Coefficents for Plane Longitudinal Incident Waves", *Geophysical Prospecting, vol. 10 pp. 403-51.*

Mayme. W. H., "Common Reflection Point Horizontal Data Techniques,"*Geophysics,* vol. 27, No. 6, 1962, p. 927.

Brillinger, D. R., "An Introduction to Polyspectra", *Annals of Mathematical Statistics,* vol. 36, 1965, pp. 1351-1374.

"AVO (Amplitude vs Offset)": Usage/Misusage, Fraiser, C. W., 58th Ann. Soc. Explor. Geophys. Int. Mtg. Oct. 30, 1988.

METHOD OF GENERATING SEISMIC WAVELETS USING SEISMIC RANGE EQUATION

This application is a continuation of application Ser. No. 07/457,261, filed Dec. 26, 1989, now abandoned.

BACKGROUND OF THE INVENTION

1. Field of the Invention

This invention primarily pertains to a method of deterministically calculating a synthetic seismic wavelet, or voltage waveform, for any desired source-to-receiver offset and any target reflector depth for the seismic, particularly, the marine environment. This invention also pertains to a method of establishing performance criteria for a data gathering system or a portion thereof.

2. Description of the Prior Art

In a typical marine seismic gathering system, it is customary that a vessel be equipped with both an acoustical energy source, usually on a submerged carrier towed by the vessel with certain control apparatus therefore being located on the vessel itself, and seismic detector array, usually in the form of a complex cable also towed by the vessel. Such a detector cable is typically towed at a shallow depth behind the vessel and is best characterized as a streamer or an extended cable including a plurality of seismic detectors or hydrophones. It is also usual for such detectors to be spaced along the streamer in arrays, rather than singly.

The returns incident on the hydrophone arrays are a result of the seismic impulses from the source being reflected from the various subsurface geologic interfaces. One such interface is the water bottom or interface between the ocean and the land. Other interfaces occur wherever there is a lithological variation or impedance change creating subsurface layers. Knowledge of such interfaces is extremely valuable in evaluating for the presence of hydrocarbon deposits and the like.

FIG. 1 herein shows the factors affecting the pulse radiated by the source. A non-isotropic source has directivity and the receiving system has a capture area. The capture area impacts the signal in other ways than just the receiving array. Subsurface related factors include divergence, transmission loss, frequency dependent absorption (Q-loss), and interbed multiple interference. Also, the target interface's reflection coefficient directly impacts the received signal, and its behavior with offset can be very important. Ambient noise and scattering contribute to degrading the signal-to-noise ratio.

Many ways exist to enhance the signal relative to noise. For example, it is well recognized that a common-depth-point (CDP) stack improves the signal-to-noise ratio over non-stacked data.

For an understanding of the concept, consider a horizontal reflecting interface with a point thereon as the "CDP". Along a parallel "datum" line above the interface, and to one side of a normal drawn to the CDP, are evenly spaced detectors. (Actually, there is normally a detector array, but for discussion herein "detector" is used to signify an associated arrayed group of individual detectors.) Along the datum line and to the other side of the normal drawn to the CDP, are equally evenly spaced sources. A first data trace would be the result of an impulse from the closest source being reflected off the interface and received at the closest detector. A second data trace would be the result of an impulse from the next closest source being reflected off the interface and received at the next closest detector. Similarly, data traces developed from successive sources to successive detectors, each resulting from a reflection off the interface at the CDP, would develop a "common depth point gather".

However, there is normally only one source in a typical marine seismic system. It is towed at a predetermined rate. Assuming that the detectors were stationary and evenly spaced, when the source was at a position corresponding to the first source in the above example, then the second, and so forth, an ideal CDP gather could be developed. In the normal system, however, the detectors are not stationary, but are towed in conjunction or at the same rate as the source. Therefore, it may be seen that a two-trace, or "two-fold" common depth point gather is developed when the source is impulsed at an initial position and then impulsed again when it and the detector cable have been towed together one-half of the detector spacing distance, the first impulse being detected by the first detector and the second impulse being detected by the second detector. The process can then be repeated for as many detectors as there are on the cable for a full-fold CDP file.

Of course, data is not actually collected in the field in the manner just described. In actual practice, a source impulse is detected at all of the detectors, and not from a common depth point. Then at a second location of the source, which normally would be at a distance from the place where the source was first impulsed, the source is again impulsed and detected at each of the detectors, again following reflection from different depth points. From the individual field recordings, data associated with a common depth point is selected and is built up in what is truly a common "CDP gather". Hence, the signal-to-noise improvement is not gained from the field recordings but from the CDP gather.

Because the travel time for an impulse from the source to the reflecting interface to the detector is longer for the second detected trace than for the first detected trace in a CDP gather, and for the third detected trace than for the second detected trace, and so forth, a time correction is necessary for the subsequent traces to position them in time with the first data trace or event so that the signal will coherently add when the traces are summed. Such a correction is referred to as the normal moveout (NMO) correction. Factors involved in making this correction, which is different for each detector event resulting from a successively spaced detector, are well-known in the art and are explained, for example, in *Geophysics*, a publication of the Society of Exploration Geophysicists, Vol. 27, No. 6, published in 1962 at page 927, in an article entitled, "Common Reflection Point Horizontal Data Stacking Techniques", W. H. Mayne, which is incorporated herein by reference for all purposes.

Once the CDP gather has undergone NMO correction, the data can be observed as is or it can be stacked. A stack is a sum of traces which correspond to the same subsurface reflection with different offset distances. The objective of stacking the CDP gather is to coherently add signal and noncoherently add random noise. This improves signal-to-noise ratio, thus, effectively increasing the primary signal amplitude. Hence, creating a CDP stack, improves the likelihood of discovery of hydrocarbon accumulation in subsurface layer.

Of all visual indicators (high amplitude, phase change, flat spot, etc.) of hydrocarbon, a high-amplitude anomaly is most obvious on a CDP stack and thus most often used. Yet unfortunately, it is also difficult to differentiate a high-amplitude reflection caused by a gas layer from that caused by a nongas layer like a high-velocity hard streak.

An effective means to distinguish a gas layer from a nongas layer resides in the amplitude-versus-offset reflection behavior in a CDP gather. For instance, in many cases the reflection coefficient at a shale-to-gas-sand interface increases in amplitude with offset, while there may be no increase of reflection coefficient with offset at a nongas interface.

A key factor for successfully evaluating either direct hydrocarbon indicators or offset-amplitude variations is called relative-amplitude processing. Its purpose is to restore the amplitude losses; i.e., divergence, transmission, absorption, and the like. This allows the reflection coefficient behavior to be revealed.

A comprehensive amplitude processing flow for obtaining improved amplitude information pertaining to the geology is "Controlled-Amplitude" processing, as suggested in *Geophysics*, Vol. 50, No. 12, published in 1985 beginning at page 2697, in an article entitled, "Offset-Amplitude Variation and Controlled Amplitude-Processing", Gary Yu.

It includes (1) applying an exponential gain for any intermediate test and processing, (2) suppressing coherent noise such as multiples or ground roll, (3) removing the exponential gain of step (1), (4) restoring amplitude losses with offset compensation, (5) deconvolution, (6) NMO correction, (7) surface-consistent consideration, (8) partial trace sum to enhance the S/N ratio for the offset amplitude study, (9) band-pass filter, (10) section-dependent equalization for a CDP gather display, (11) stack, and (12) region-dependent equalization for the stacked section.

This processing flow has been used successfully. Yet there is still a degree of uncertainty because the actual data is used for making the estimations to minimize the amplitude losses with offset, and the data (particularly prestack data) can be highly contaminated with noise. Also there is no way to monitor the accuracy of the results in mid-process.

This invention is the response to the need for the development of a model of the offset dependent factors which can be used to correct the seismic data. Motivation for this work initially came from radar. Radar echo calculations are normally made for received pulse power. The formula used for radar echo calculations is called the "radar range equation". The radar range equation permits echo strength calculations from known system parameters, the propagation path, and the target characteristics. It can be found in any standard radar text, for example, *Introduction to Radar Systems Analyses*, a publication of a McGraw-Hill Book Company, New York, published in 1962, M. I. Skolnik especially at pages 3-5 and 570-579, or *Radar System Analysis*, a publication of Prentice Hall, Inc., Englewood Cliffs, N.J., published in 1965, D. K. Barton. The seismic equivalent to the radar range equation can be referred to as the "seismic range equation". However, there are significant differences.

In radar, the propagation medium is often assumed to be homogeneous and isotropic so that spherical spreading or divergence is usually assumed from the transmitting antenna to the target and also back from the target to the receiving antenna. Quite often a radar radiates a train of identical high energy rectangular sine wave pulses. Each pulse is generated by a transmitter and radiated into space by an antenna. Even when the pulse is short it is radiated on a large carrier frequency so that the radiation approximates being monochromatic. The antenna usually has high gain or directivity, and the target is usually assumed to reside at some range on the antenna boresight. A single antenna is often used for both transmission and reception. A radar operating in this fashion is called monostatic. The pulse duration, antenna beam, and target range are usually all large enough that the target can be treated as a point. It intercepts and re-radiates a portion of the beam and a small amount returns to the antenna. Some of the return is collected by the antenna and dissipated in the load impedance. The antenna and load impedances are almost always assumed to be complex conjugate matched.

The seismic case is more complicated. Seismic signals are broadband. They cannot be treated as monochromatic. The amplitude and phase spectra must be determined for many frequencies across the seismic band in order to calculate a wavelet. The source and receiver are at different locations making seismic systems bistatic rather than monostatic. The source and receiving system both impact the wavelet differently depending on their offset. A different radiated source pulse must be considered depending on the offset distance. Also, the receiving pattern and phase effects due to the hydrophone array image depend on offset. Another major factor is that the propagation medium is not homogeneous and isotropic. Rather, it consists of perhaps hundreds of layers of materials exhibiting different physical characteristics. The target is an interface in this medium. It is quantified by its P-wave reflection coefficient. Spherical spreading does not apply because of refraction at each interface. The subsurface also exhibits dissipation into heat, conversion of P-wave energy into S-wave energy, P-wave energy lost to reflected P-waves, and interference effects due to interbed multiples. The attenuation acts as a minimum phase filter. The interbed multiples are superimposed on the primary. All these subsurface effects depend on the ray paths through the subsurface and hence on the selected offset. The target reflection coefficient also depends on the offset distance between the source and receiver.

Since a homogeneous isotropic medium, often assumed for radar calculations, is not appropriate for the seismic problem, a horizontally layered medium shown in FIG. 3 herein is assumed. Each layer is homogeneous and isotropic. The $i^{th}$ layer has with thickness $h_i$, P-wave velocity $\alpha_i$, S-wave velocity $\beta_i$, density $\rho_i$, and attenuation constant, $Q_i$. For a given offset and target depth, Snell's Law is used to find the ray path from the source to the hydrophone array thereby determining the ray angle, $\theta_i$, in each layer. This calculation is well understood. Unlike a radar point target, the seismic target is an interface between two beds having specified P-wave velocities, S-wave velocities, and densities. Target strength is quantified by the P-wave reflection coefficient for the angle of incidence found when determining the ray path.

For seismic work, the idea of pulse power at a precise frequency simply does not have the same meaning as it can for radar. Power can make sense by imagining that a seismic source is fired periodically and then considering the power at a precise Fourier frequency. In the limiting case of a single firing, this power becomes energy density times the differential frequency increment, df. Energy density is energy per hertz.

Radiated energy density from the source does not spread spherically. One reason is because of the refractions at the interfaces. By following an approach similar to that as suggested in *Geophysics*, Vol. 38, No. 3, published in 1973 at pages 481-487, in an article entitled, "Divergence Effects in a Layered Earth", P. Newman, a factor can be found which when divided into radiated energy density yields the incident energy density per unit area on the hydrophone array. This factor is referred to as "divergence" herein. It is slightly different from the factor that Newman calls divergence. The energy density dissipated in the load attached to the hydrophone array is equal to the incident energy density per unit area times the receiving system's capture area. This received energy density is then scaled by source directivity, the target interface's power reflection coefficient, and losses associated with the layered subsurface. Three losses are introduced: transmission loss, interbed multiple loss, and Q-loss. The subsurface loss is their product. Other losses such as those associated with layers not being truly homogenous or isotropic could be incorporated in this subsurface loss. Transmission and reflection coefficients at each interface are found by solving the Zoeppritz equations described in *Reflection Seismology a Tool for Energy Resource*, a publication of John Wiley and Sons, New York, published in 1981, K. H. Waters, especially at pages 27-47 and 254-259. Transmission loss is found by determining the product of the transmission coefficients for the entire ray path. Interbed multiple loss is found by noting that reflected rays at each interface can be reflected again and again and end up at the offset of interest. These interbed multiples interfere with the direct primary signal incident on the hydrophone array. This interference, generated from the entire subsurface is referred to herein as "interbed multiple loss". The Q-loss is the frequency-dependent absorption taking place in the layers (Waters, 1981).

Therefore, it is a feature of this invention to deterministically calculate the offset-dependent factors attributable to the geology above the target beds and the data collection means by utilizing what is referred to herein as the "seismic range equation". A result of this feature is the ability to model fully uncorrected seismic data. Modeling uncorrected data is advantageous because these models can be processed along with the data for comparison at any stage of processing. The processing consists of using the offset-dependent factors to correct the data and the model.

It is another feature of this invention to provide an improvement in the ability to sharpen both processed and unprocessed seismic data and model for both prestacked and stacked seismic data and model.

It is still another feature of this invention to provide an improved method of seismic system analysis and seismic system design.

SUMMARY OF THE INVENTION

The method of modeling disclosed herein comprises a deterministic way of calculating a seismic wavelet, representing a pulse returned from the subsurface, in terms of amplitude and phase, for any desired offset and depth for the marine environment, utilizing what is herein called the "seismic range equation". The equation is new although some of its factors have been discussed in *Geophysical Prospecting*, Vol. 19, at pages 430-458, published in 1971, in an article entitled "Reflections on Amplitudes", R. F. l'Doherty and N. A. Ansley. The calculated wavelet is the received voltage waveform across the load attached to the hydrophone array output. Its amplitude spectrum is determined by (1) calculating received energy density using the seismic range equation and then by (2) using the load impedance to scale received energy density into the voltage amplitude spectrum. The wavelet's phase spectrum (1) starts out as the phase of the far-field source pulse in the ocean, (2) is modified by minimum-phase earth filtering, and (3) is further modified by the receiving system. Of course, a recorded wavelet depends on subsequent filtering experienced before the voltage waveform is preserved on magnetic tape. This sort of filtering is well understood and is not taken up herein although it is included in the examples.

The seismic range equation, written in terms of energy density, is as follows:

$$E_r(f) = \frac{E(f)D(\theta_s, \phi_s, f)A_c(\theta_H, \phi_H, f)R_T^2}{D_v L(f)} \quad (1)$$

where
$E_r(f)$ = received electrical energy density
$E(f)$ = radiated energy density from the source
$D(\theta_s, \phi_s, f)$ = source directivity along the primary's downgoing direction $\theta_2, \phi_s$
$A_c(\theta_H, \phi_H, f)$ = Capture area for radiation incident angle along primary's direction $\theta_H, \phi_H$
$R_T^2$ = target's power reflection coefficient for primary's incident angle
$D_v$ = primary's divergence $L(f)$ = other loss factor associated with system and subsurface
= $L_t L_Q(f) L_{ib}(f)$(for this embodiment of the invention)
= primary's transmission loss * primary's Q-loss * interbed multiple loss Received energy density is found by evaluating the right-hand side of equation (1). It is used to determine the amplitude spectrum for a wavelet. Incorporated into the amplitude spectrum are the offset dependent factors. Once the corresponding phase spectrum is determined, the wavelet is determined. By convolving this wavelet with the reflection coefficient sequence of hypothetical geologic beds, a model of an unprocessed seismic trace has been deterministically created. This procedure can be repeated at the appropriate offsets to create a model gather. The model gather can be used in comparisons with real gathered seismic data. The wavelets can be used in an inverse operation called deconvolution to correct the model and the real data for the offset-dependent compensation. The wavelets can be used to simply improve the resolution in seismic data. The wavelets can also be used to aid in seismic system analysis.

BRIEF DESCRIPTION OF DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the drawings, which drawings form a part of this specification. It is to be noted, however, that the appended drawings illustrate only a preferred embodiment of the invention and are therefore not to be considered limiting of its scope, for the invention may admit to other equally effective embodiments.

In the Drawings:

FIG. 13b shows a seismic gather and a model gather after deterministic pre-stack deconvolution using the wavelet shown in FIG. 13a.

DESCRIPTION OF THE PREFERRED EMBODIMENT

Since the early 1970's numerous efforts have been made by the exploration industry to improve the resolution and accuracy of marine seismic data. Improvements have centered around controlled energy sources, digital recording and data processing. Instantaneous floating point recording and matching processing in high speed computers have substantially improved the reliability of reflection data and opened the door to more elaborate procedures such as migration and impedance displays, wavelet processing, synthetic modeling and three-dimensional presentation. All of these processes were aimed at improving the range of usefulness of the final resulting data. This has enhanced "stratigraphic" detailing and reservoir engineering as checked by frequently using well-logging data as an input to the processing. However, earlier supposed breakthroughs that in some cases later turned out to be disappointments, such as "Bright Spot", have taught the industry against depending on various computer techniques based on inadequate data or simple models.

The invention herein employs a method to determine the accuracy of marine seismic data without the previously required corrections on the actual gathered data. This breakthrough in data evaluation is performed by comparing the gathered data to a model of the data which incorporates losses due to the data gathering system and the subsurface. The model is of unprocessed data. The wavelets used to generate the model also can be used to process the data and the models. This breakthrough is also demonstrated by a second example which compares a deterministically calculated stacked wavelet with one that is statistically extracted from the stacked data.

Figure 1:
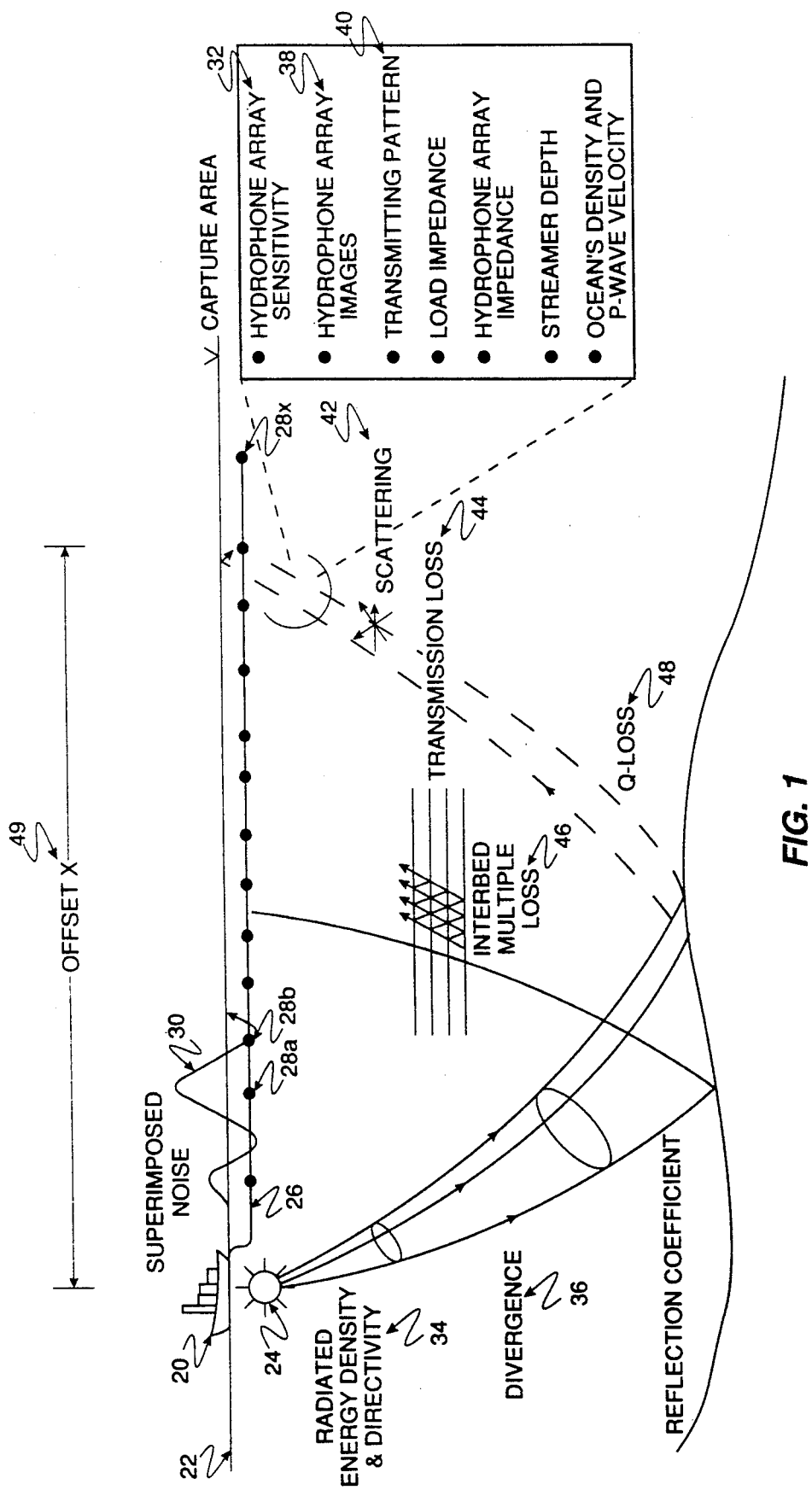
FIG. 1 is a schematic representation of a marine data gathering system, including offset-dependent losses.
Figure 4:
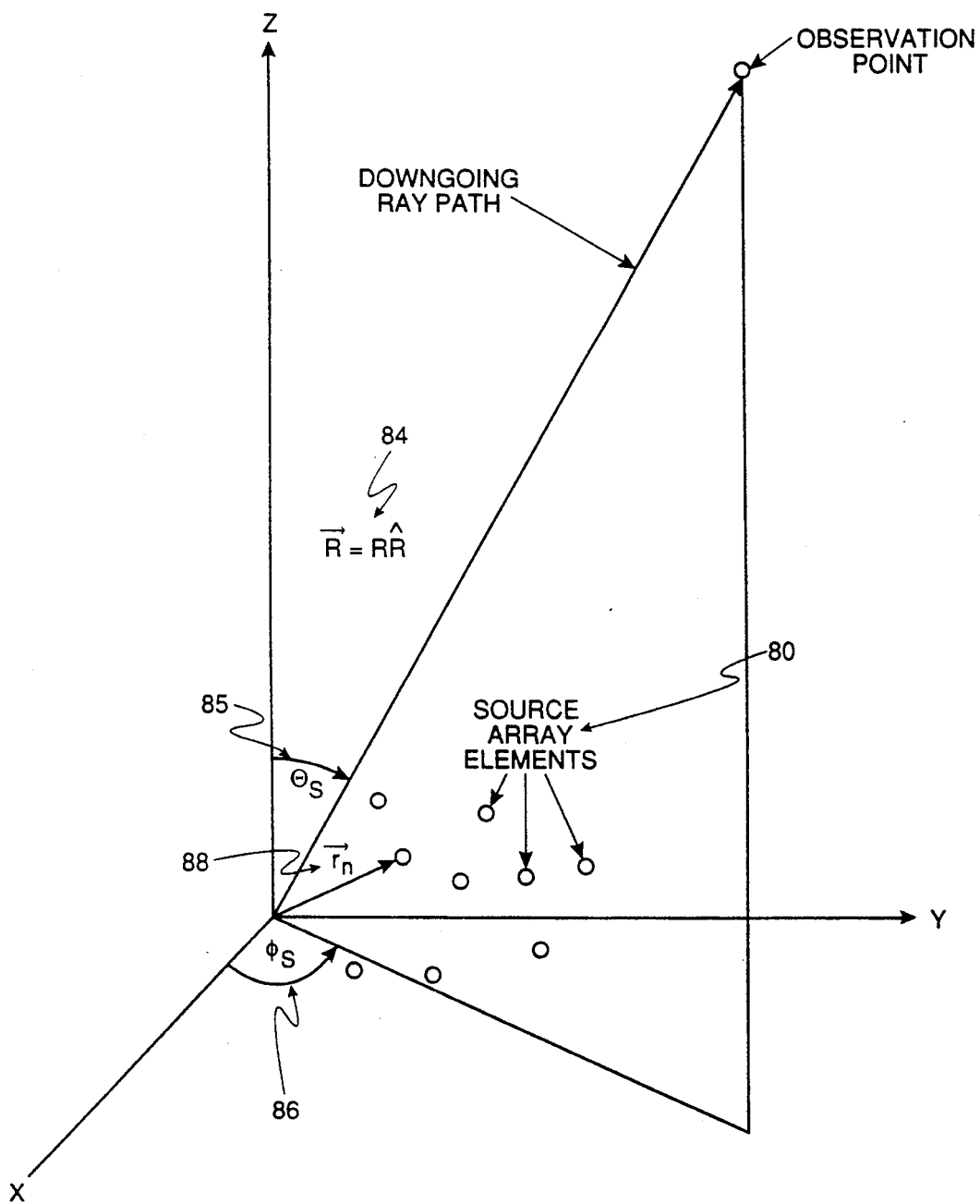
FIG. 4 is the three dimension source array geometry representation used in accordance with the present invention.

Now referring to the drawings and first to FIG. 1, a marine seismic vessel 20 is shown moving on surface 22 of a body of water, normally the sea. An energy source 24, consisting of either a single source or a source array with elements N (geometrical description in FIG. 4) is towed by vessel 20 for imparting an impulse downward into the water. Also towed by vessel 20 is a cable or streamer 26 along which are located a plurality of hydrophone arrays or detectors, 28a, 28b, ..., 28x.

As shown in FIG. 1, a primary signal experiences many effects due to the gathering system and the subsurface. These effects all impact to the received signal and resulting signal-to-noise ratio.

The basis of this invention is to create a model of the wavelet (or seismic pulse returned from subsurface) for a given receiver, positioned at a given offset, X, 49, from the source, incorporating all the factors that the pulse will incur which are calculated deterministically (rather than statistically from the data itself). These factors include the sources' radiated energy density and directivity 34, hydrophone array sensitivity 32, divergence 36, hydrophone array transmitting pattern including images 40 and 38, transmission loss 44, interbed multiple loss 46, and Q-loss (or absorption) 48. Superimposed noise 30 and scattering 42 are not considered in this approach. However, they are commonly overcome by stacking the data at a common depth point (CDP) or by other methods.

Figure 2:
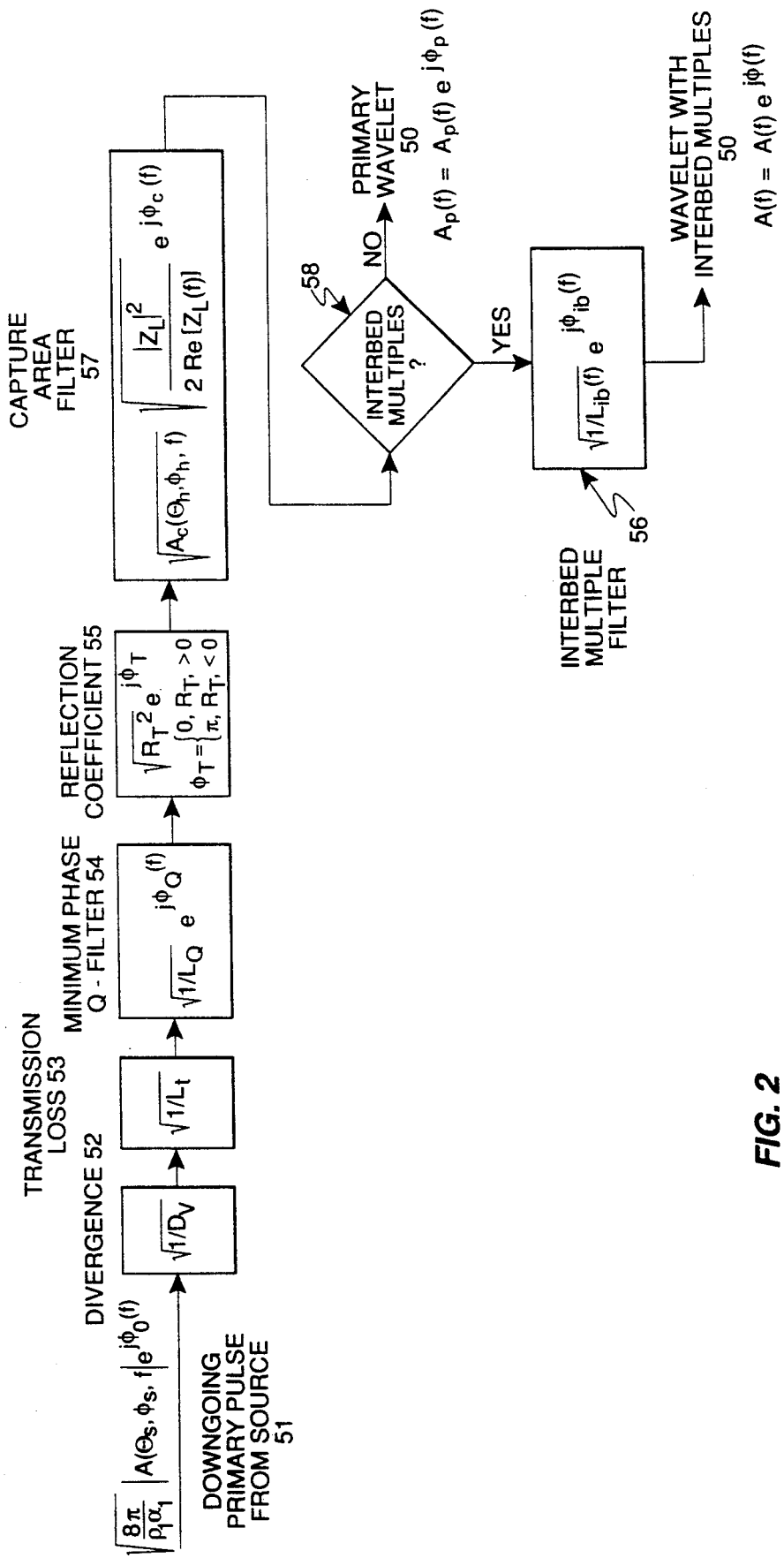
FIG. 2 is a flow diagram showing the elements of the seismic range equation used in accordance with this invention.

FIG. 2 represents a general block diagram of the invention. A frequency spectrum (amplitude and phase) for a model wavelet 50 (either with or without interbed multiples) is determined by incorporating the offset dependent factors into a downgoing primary pulse from source 51. As shown, this invention incorporates the effects of divergence 52, transmission loss 53, reflection coefficient 55, Q-loss 54 and capture area 57 as well as those associated with the interbed multiple loss 56 (if calculation is requested). The capture area includes the amplitude and phase contribution of hydrophone array transmitting pattern (equals the receiving pattern), hydrophone array sensitivity, hydrophone array images, hydrophone array impedance, and load impedance. The resulting wavelet represents a model of the actual wavelet created by the interactive effects of the data gathering system and subsurface.

Prior to this invention, deterministic model wavelet calculations incorporated some of the factors but never all of the factors in one analytic formulation.

This invention provides an option to include the interbed multiple factor 58 into the model wavelet. Experimentation has been done to show that inclusion of the interbed multiple loss impacts the shape of the model wavelet minimally, as compared to the significant cost incurred resulting from the computer requirement.

Figure 3:
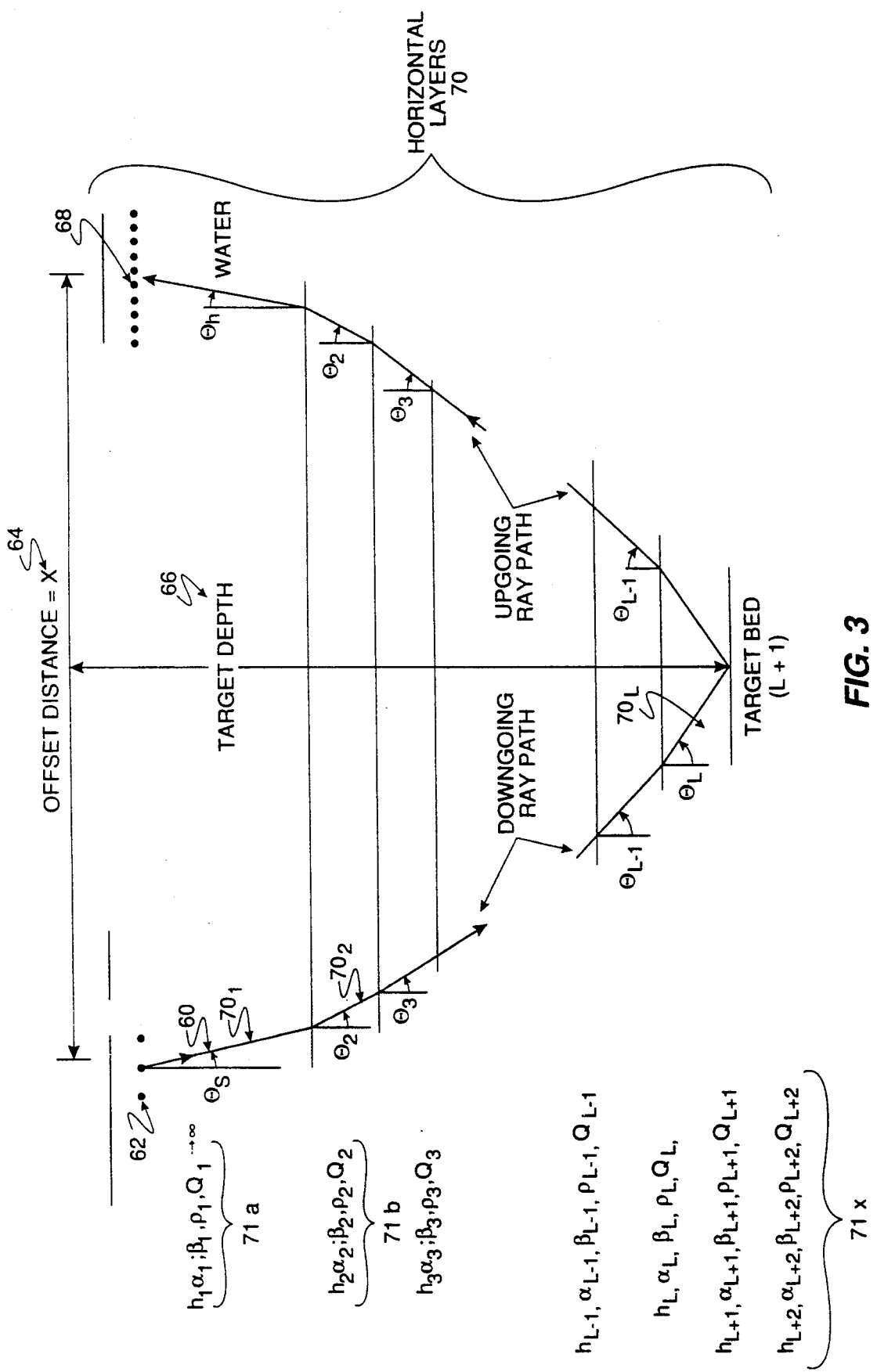
FIG. 3 is a diagram of a primary signal path from source to receiver used in accordance with the present invention.

FIG. 3 shows the path of the primary signal generated from the source 62, for a given offset distance 64 and target depth 66, used to determine the primary signal (or voltage waveform) received by the load at hydrophone array's output 68. Since a homogeneous isotropic medium, often assumed for radar calculations, is not appropriate for the seismic problem, the primary is assumed to transverse the horizontally layered medium 70 as shown. Each individual layer is assumed to be homogeneous and isotropic and accompanied by constant subsurface characteristics 71a, 71b, ..., 71x.

The method for creating a model gather of unprocessed data for a specified target comprises a sequence of steps involving mathematical calculations and manipulations. The calculations or manipulations are most conveniently and practically performed using a digital computer, such as manufactured by Cray, IBM, or the like. The model gather, once generated, can then be compared to or used in conjunction with corresponding datasets. In seismic data processing, a "dataset" is the term used to define a set of digitized seismic traces, such traces having been recorded in a seismic field survey.

Figure 5:
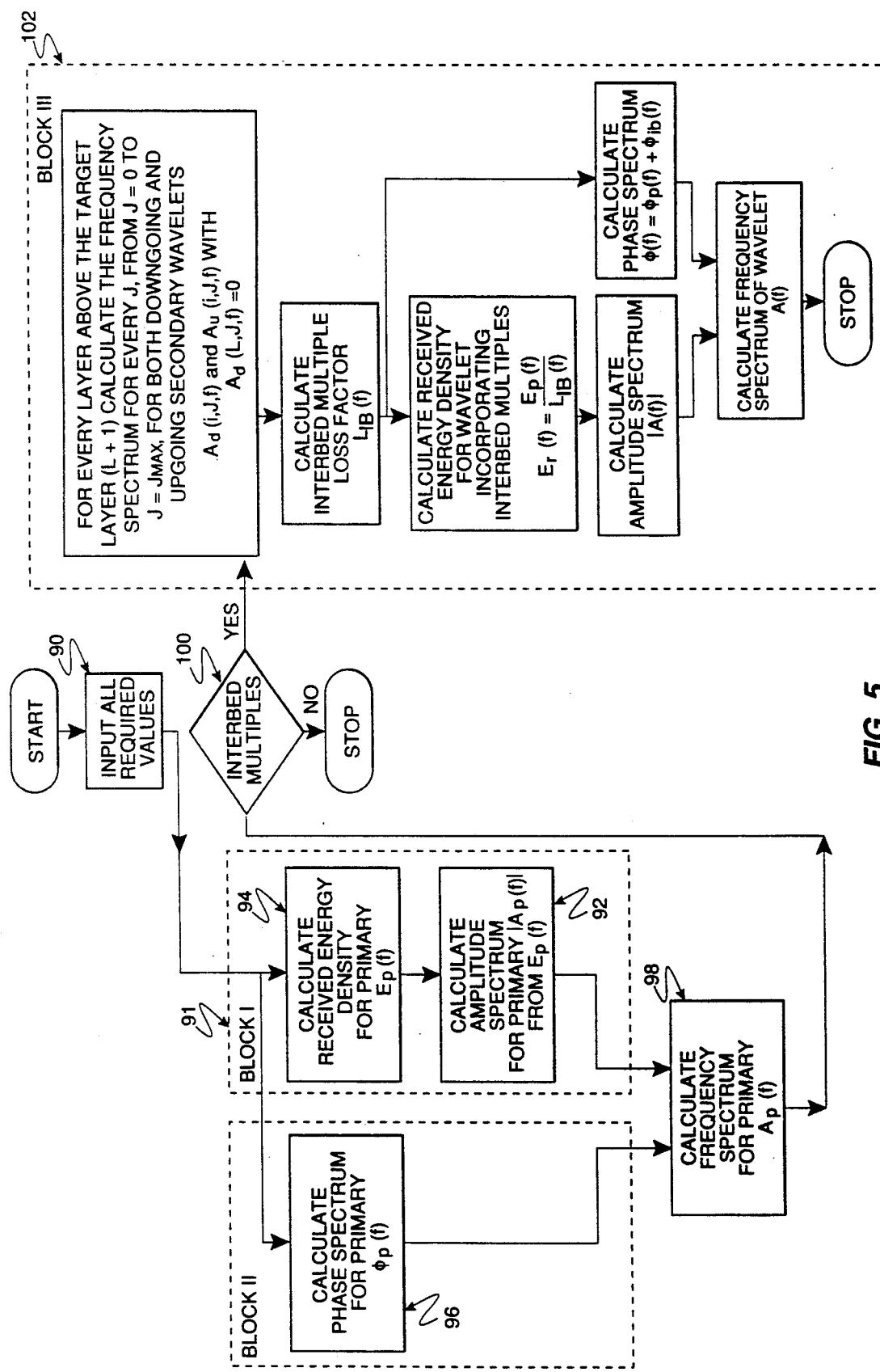
FIG. 5 the block diagram determining a wavelet's frequency spectrum used in accordance with this invention.

FIG. 5 shows a block diagram of a program used to calculate a model wavelet's frequency spectrum (phase and amplitude) for a given offset and target depth. In order to run the program the following information about the data gathering system and subsurface is required, as shown in block 90:

DATA GATHERING SYSTEM PARAMETERS

Number of source array elements, minimum number being one—N (80 FIG. 4)
Individually radiated waveforms from each element
Source array geometry (FIG. 4)
Firing delay associated with source array elements—$\delta_n$
Hydrophone array geometry
Hydrophone array impedance—$Z_H$(200 FIG. 7)
Load impedance $Z_L$(202 FIG. 7)
Hydrophone array sensitivity—$S_H(f)$
Hydrophone array depth—$d_H$ If there is no firing delay (the usual case) between source array elements, $\delta_n$ is zero for all n.

PHYSICAL SUBSURFACE CHARACTERISTICS FOR EACH EXISTING LAYER (i) BETWEEN THE SURFACE AND THE TARGET LAYER

Target depth $$-\sum_{i=1}^{L} h_i$$

P-wave velocity—$\alpha_i$
S-wave velocity—$\beta_i$
Density—$\rho_i$
Thickness—$h_i$
Attenuation constant—$Q_i$

REQUEST FOR INTERBED MULTIPLE COMPUTATION

Number of interbed multiples generated by each subsurface interface=$J_{max}+1$

Well data and seismic data can be used when establishing the parallel layered subsurface. Thicknesses, P-wave velocities, and densities for many of the layers are normally established directly from well logs by techniques well known in the industry. Robustness testing has shown that well data is not required to be exactly from the target of interest for acceptable results. However, this same testing has also shown that the closer the better. Layers between the ocean bottom and the beginning of the well data can be estimated using the best information at hand or they can be filled in statistically. Even a single layer can be used to fill in between the ocean bottom and the well data. When filling in statistically we typically use the top layers from the well data, or data from some other nearby well, to extract statistical parameters (i.e., average values and standard deviations) which we then use to determine layers for filling in above the well data. Shear wave velocities can be obtained from a S-wave log, calculated from the P-wave values and estimated lithology, or a fixed $\alpha_i/\beta_i$ ratio can be assumed for all the layers (except i=1). Attenuation constants, $Q_i$, can be estimated from seismic data or vertical seismic profile (VSP) data. Typically, seismic data from the area of interest is used for estimating an effective Q down to the target depth using spectral ratio techniques or Q-sweeps. This Q is then used for all the beds except the ocean which is assumed to exhibit no attenuation ($Q_1 \rightarrow \infty$).

Once all required information is put into the computer, the program will perform block I 91, that is, the program will compute amplitude spectrum 92 of the primary from the received energy density calculated from seismic range equation 94.

Figure 6:
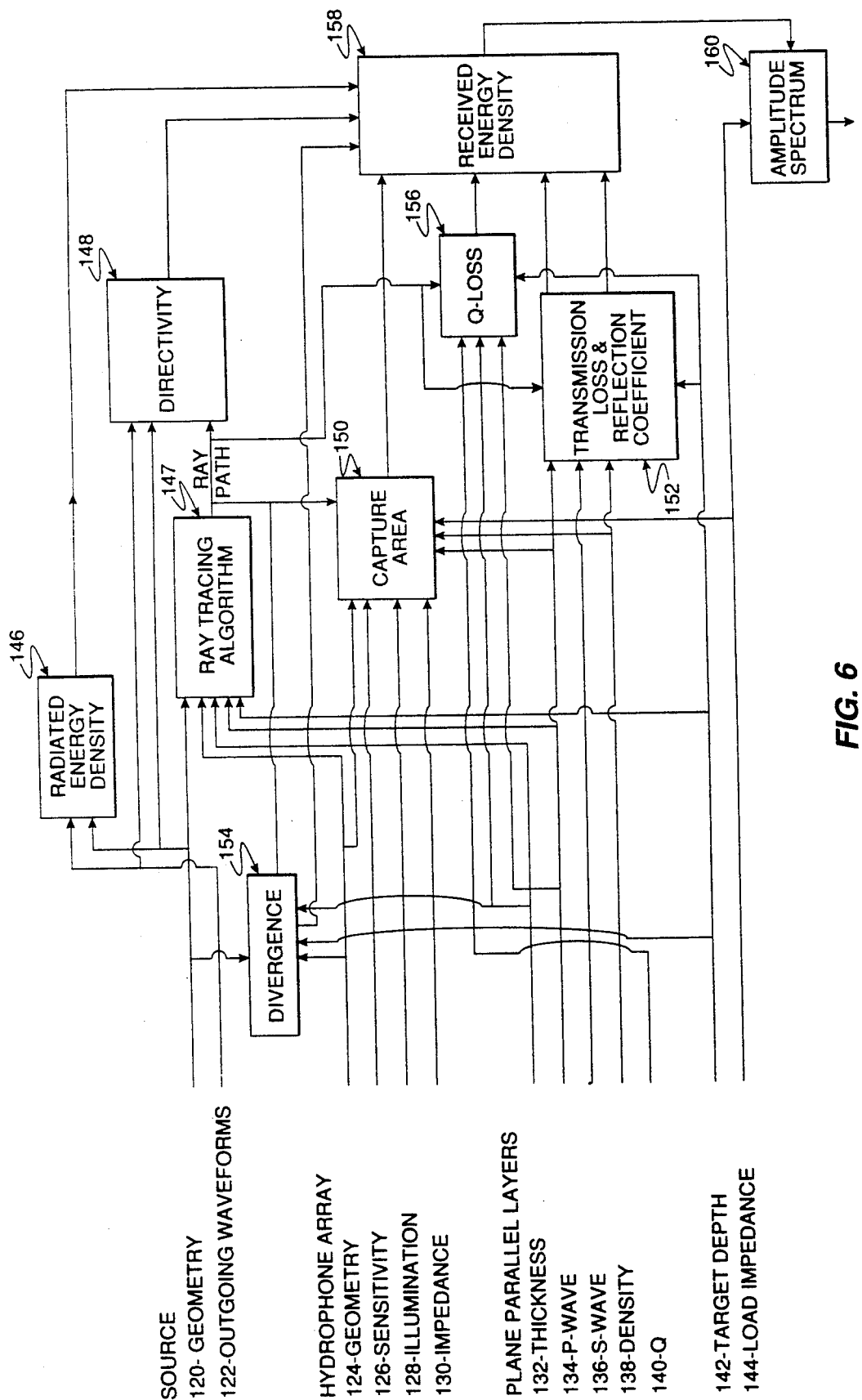
FIG. 6 is the block diagram illustrating the received energy density amplitude spectrum calculation.

FIG. 6 represents a detailed block diagram of block I (FIG. 5). Each block, aside from the ray tracing algorithm, represents factors in the seismic range equation. The interbed multiple loss factor $L_{IB}$ in Block III (FIG. 5) depends on the primary and all the interbed multiples generated by the subsurface and will be included if requested.

The ray tracing algorithm 147 will find the ray path for the primary and any interbed multiple from the source to the hydrophone array, thereby determining the ray angle, $\theta_i$, in each layer, for a given offset and target depth using Snell's Law.

Radiated energy density 146 can be determined for any marine source array when (1) individual elements radiate isotropically, (2) their individual waveforms are specified 122, and (3) the array geometry is specified 120. The mathematical expression for the radiated energy density is:

$$E(f) = \frac{4\pi}{\rho V} \sum_{n,m=1}^{2N} I_n(f) I_m^*(f) \frac{\sin(2\pi f |r_n - r_m|/V)}{2\pi f |r_n - r_m|/V} \quad (2)$$

N is the total number of real source array elements (80 FIG. 4), 2N is the number of real elements plus image elements, f is frequency, $V = \alpha_1$ is the P-wave velocity of the first layer, $\rho = \rho_1$ is the density of the first layer, $r_n$ is the position vector to the $n^{th}$ element (88 FIG. 4), $I_n(f)$, the illumination factor, is given by the following equation:

$$I_n(f) = A_n(f) e^{j2\pi f \delta_n}. \quad (3)$$

where $\delta_n$ the firing delay associated with the $n^{th}$ element and $A_n(f)$ is the frequency spectrum of the waveform radiated from the $n^{th}$ element. The image waveform corresponding to equation (3) is $-I_n(f)$ where a perfect $-1$ reflection coefficient is assumed for the ocean surface. Variations in the amplitude of $I_n(f)$ as a function of n can be thought of as an amplitude taper across the array, whereas variations in the phase of $I_n(f)$ can be thought of as a phase taper across the array. Amplitude variations can result from using different air-gun types or sizes, while phase variations can result from different initial phases from the air guns plus any additional phase differences created by nonsynchronous firing.

The source directivity, 148 in FIG. 6, is the ratio of energy density per unit solid angle radiated into a particular direction to the average radiated energy per unit solid angle and has been defined in *Geophysics*, a publication of the Society of Exploration Geophysicists, Vol. 53, No. 5, published in 1988, at pages 650-658, in an article entitled, "A Theory for Marine Source Arrays", R. E. Duren. It is given by the following expression:

$$D(\theta_s, \phi_s, f) = 2 \frac{\sum_{n,m=1}^{2N} I_n(f) I_m^*(f) e^{j2\pi R \cdot (r_n - r_m)/V}}{\sum_{n,m=1}^{2N} I_n(f) I_m^*(f) \frac{\sin(2\pi f |r_n - r_m|/V)}{2\pi f |r_n - r_m|/V}} \quad (4)$$

R is a unit vector (84 FIG. 4) along the $\theta_s$, $\phi_s$ direction (85 and 86 respectively, FIG. 4) and the other variables were defined for equation (2). A direction must be specified along with the array geometry and the outgoing waveforms in order to evaluate equation (4).

The capture area, 150 in FIG. 6, is that area which when multiplied times the incident energy density per unit area equals the energy density dissipated in the load impedance attached to the hydrophone array output. The capture area for any arbitrary direction is equal to the capture area along the acoustic axis times the transmitting pattern of the hydrophone array and is given by the following equation:

$$A_c(\theta_H, \phi_H, f) = A_c(0, \phi_H, f) \frac{D_H(\theta_H, \phi_H, f)}{D_H(0, \phi_H, f)} \quad (5)$$

For frequency f, $D_H(\theta_H, \phi_H, f)$ is the directivity of the hydrophone array along the incident direction $\theta_H, \phi_H$. The acoustic axis is defined by $\theta_H = 0$ which is directed vertically into the ocean. Equation (4) is the means with which to calculate the transmitting pattern for a hydrophone array. Array geometry (124, FIG. 6) and illumination (128, FIG. 6) must be specified. For the typical parallel electrical hook-up $I_n(f) = 1$ for the real elements and $I_n(f) = -1$ for the images. The capture area along the acoustic axis depends on the array sensitivity, hydrophone array depth, hydrophone array impedance, and load impedance.

Figure 7:
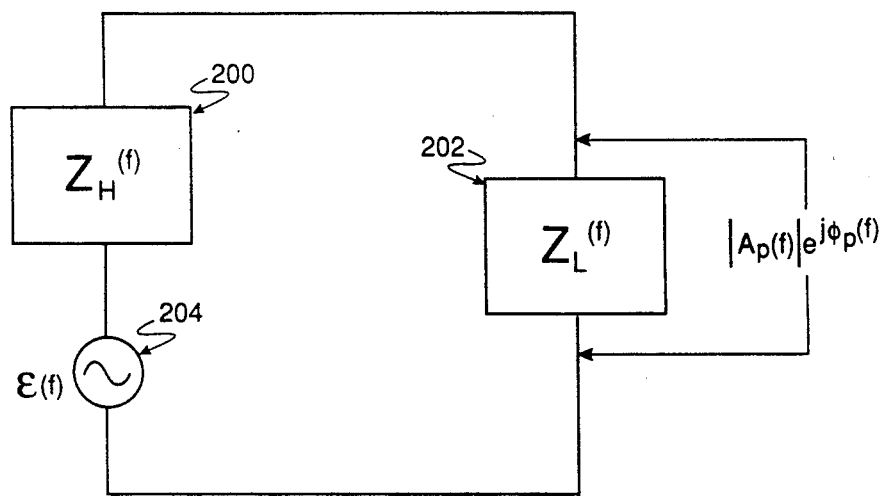
FIG. 7 is the equivalent circuit showing the primary's voltage waveform across the load impedance used in accordance with this invention.

In order to determine the capture area along the acoustic axis, first consider the function of the receiving system. The piezoelectric crystals within a hydrophone array convert an incident pressure pulse into an electromotive force. Energy is subsequently dissipated in the load attached to the hydrophone array. This dissipated energy is the received energy. FIG. 7 is an equivalent circuit showing a hydrophone array and its load with impedances $Z_H(f)$, 200, and $Z_L(f)$, 202, respectively. For the primary, the amount of energy received between frequency f and f+df is given by $E_p(f)df$ where $E_p(f)$ is the primary's received energy density or energy per hertz at frequency f. It depends on several factors: (1) the incident energy density per unit area, $E_i(f)$, in the pressure pulse, (2) the pulse's arrival direction, $\theta_H$ and $\phi_H$, (3) hydrophone array sensitivity $S_H(f)$, and (4) the hydrophone and load impedances $Z_H$ and $Z_L$, respectively.

It follows that, the capture area along the acoustic axis for a hydrophone array operating in an infinite homogeneous medium is:

$$A_c(0, \phi_H, f) = \frac{|S_H(f)|^2}{|Z_L(f) + Z_H(f)|^2} \rho V \operatorname{Re}(Z_L(f)) \quad (6)$$

$\rho$ is the density of the first layer transversed and $V = \alpha_1$, is the P-wave velocity of the first layer transversed.

A more realistic configuration is when the hydrophone array is positioned near the ocean's surface. The corresponding capture area along the acoustic axis is earth's energy density and P-wave velocity:

$$A_c(0, \phi_H, f) = \quad (7)$$
$$2[1 - \cos(4\pi f d_H/\alpha_1)] \frac{|S_H(f)|^2}{|Z_L(f) + Z_H(f)|^2} \rho V \operatorname{Re}(Z_L(f))$$

Therefore, the capture area for any arbitrary direction in an infinite medium can be found by substituting equation (6) into (5) with no images entering the transmitting pattern calculation. And the capture area for any arbitrary direction when the hydrophone is positioned near the ocean surface can be found by substituting equation (7) into equation (5) with images included in the transmitting pattern calculation.

The target reflection coefficient, 152 in FIG. 6, $R_T$ is found by solving the Zoeppritz equations. It depends on the angle of incidence and the physical parameters of the layers defining the target interface. There are many references on the Zoeppritz equations. An example is in *Geophysical Prospecting*, Vol. 10, at pages 304–351, in an article entitled, "Reflection and Transmission Coefficients for Plane Longitudinal Incident Waves", O. Koefoed.

This invention introduces an innovative manipulation of the Zoeppritz equation useful for determining interface reflection coefficients as well as transmission coefficients via computer solution. The basis for this finding is when a wave arrives at an interface separating two media having different elastic properties, the interface gives rise to reflected and refracted waves. The relationships between the various wave amplitudes can be found from the relations between stresses and strains on the two sides of the interface. At the boundary between two media, the stresses and strains must be continuous. Both the normal and tangential components of stress must be continuous at the boundary. The normal and tangential components of displacement must also be continuous. When there is a solid-fluid interface the normal stress and displacement are continuous and tangential stress in the solid vanishes at the interface. When one or both solid media are replaced by a fluid or vacuum, the boundary conditions are reduced in number.

Figure 8:
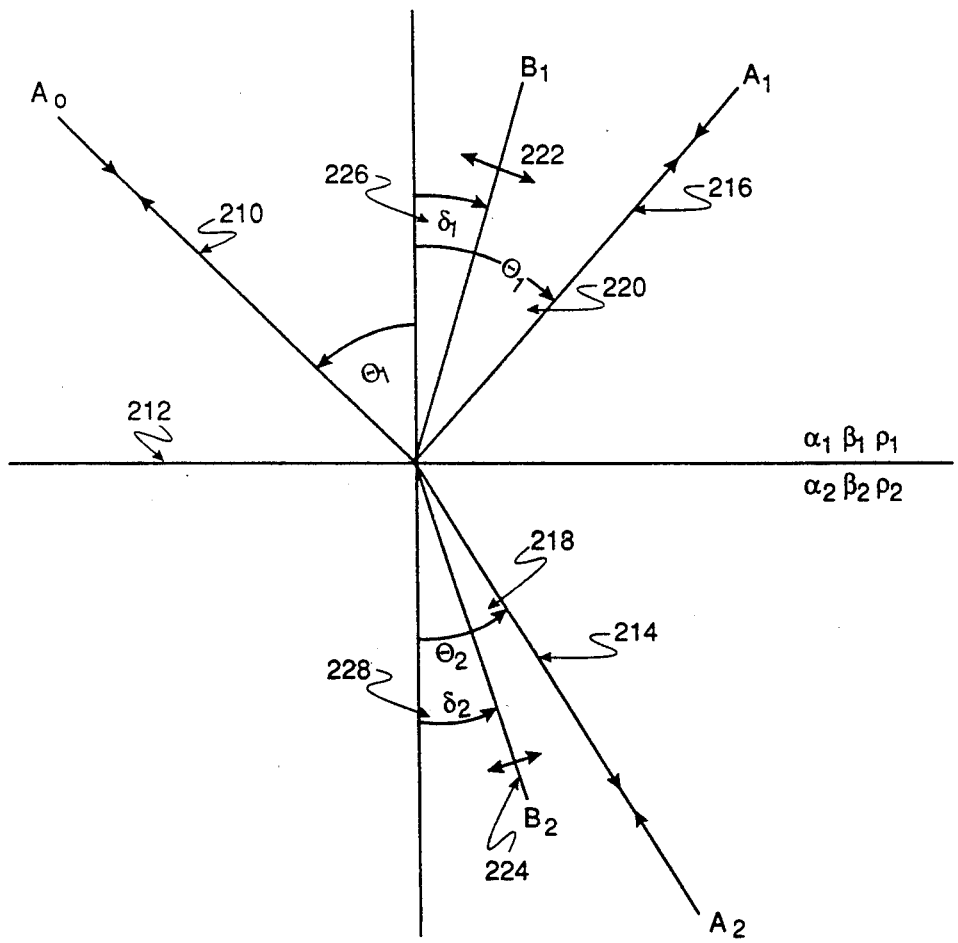
FIG. 8 is a diagram of the displacement amplitudes generated by a incident P-wave on an interface used in accordance with this invention.

FIG. 8 is a representation of a P-wave ($A_0$) 210 incident on an interface 212. It must generate a reflected ($A_1$) 216 and refracted ($A_2$) 214 P-wave at angles $\theta_1$ 220 and $\theta_2$ 218, respectively, and reflected ($B_1$) 222 and refracted ($B_2$) 224 converted S-waves at $\delta_1$ 226 and $\delta_2$ 228, respectively. These parameters are used in the following equations to determine the reflection and transmission coefficients, R and T, respectively, for the specified interface:

solid-to-solid $$a_{11}R + a_{12}T = c_{11} \quad (8a)$$

$$a_{21}R + a_{22}T = c_{21} \quad (8b)$$

where $$a_{11} = \frac{\cos\theta_1 - \tan\delta_2\sin\theta_1}{\cos\delta_1(\tan\delta_1 + \tan\delta_2)} - \frac{\frac{\alpha_1}{\beta_1}\cos2\delta_1 - \frac{\beta_2}{\alpha_1}\tan2\delta_2\sin2\theta_1}{\cos2\delta_1(\tan\delta_1 + \tan\delta_2)} \quad (8c)$$

$$a_{12} = \frac{\cos\theta_2 + \tan\delta_2\sin\theta_2}{\cos\delta_1(\tan\delta_1 + \tan\delta_2)} + \frac{\frac{\rho_2\alpha_2}{\rho_1\beta_1}\cos2\delta_2 + \frac{\rho_2\beta_2^2}{\rho_1\alpha_2\beta_1}\tan2\delta_2\sin2\theta_2}{\cos2\delta_1(\tan\delta_1 + \tan\delta_2)} \quad (8d)$$

$$c_{11} = \frac{\cos\theta_1 - \tan\delta_2\sin\theta_1}{\cos\delta_1(\tan\delta_1 + \tan\delta_2)} + \frac{\frac{\alpha_1}{\beta_1}\cos2\delta_1 + \frac{\beta_1}{\alpha_1}\tan2\delta_2\sin2\theta_1}{\cos2\delta_1(\tan\delta_1 + \tan\delta_2)} \quad (8e)$$

$$a_{21} = \frac{\rho_1\beta_1\beta_2\sin2\theta_1\tan2\delta_1 + \rho_1\alpha_1^2\cos2\delta_1}{\rho_2\alpha_1\beta_2\cos2\delta_2(\tan\delta_1 + \tan\delta_2)} + \frac{\sin\theta_1\tan\delta_1 + \cos\theta_1}{\cos\delta_2(\tan\delta_1 + \tan\delta_2)} \quad (8f)$$

$$a_{22} = \frac{\beta_2^2\sin2\theta_2\tan2\delta_1 - \alpha_2^2\cos2\delta_2}{\alpha_2\beta_2\cos2\delta_2(\tan\delta_1 + \tan\delta_2)} - \frac{\sin\theta_2\tan\delta_1 - \cos\theta_2}{\cos\delta_2(\tan\delta_1 + \tan\delta_2)} \quad (8g)$$

$$c_{22} = -\frac{-\rho_1\beta_2^2\sin2\theta_1\tan2\delta_1 + \rho_1\alpha_1^2\cos2\delta_1}{\alpha_1\beta_2\rho_2\cos2\delta_2(\tan\delta_1 + \tan\delta_2)} + \frac{-\sin\theta_1\tan\delta_1 + \cos\theta_1}{\cos\delta_2(\tan\delta_1 + \tan\delta_2)} \quad (8h)$$

Solution to equation (8a) and (8b) will yield the P-wave reflection and transmission coefficient across a solid-to-solid interface.

fluid-to-solid $$R\cos\theta_1 + T[\cos\theta_2 + \beta_2\sin2\theta_2\sin\delta_2/(\alpha_2\cos2\delta_2)] = \cos\theta_1 \quad (9a)$$

$$-R + T[\rho_2\alpha_2\cos2\delta_2/(\rho_1\alpha_1) + \rho_2\beta_2^2\tan2\delta_2\sin2\theta_2/(\rho_1\alpha_1\alpha_2)] = 1 \quad (9b)$$

Solution to equation (9a) and (9b) will yield the P-wave reflection and transmission coefficient across a fluid solid interface.

(No S-waves exist in medium 1.)
solid-to-fuild $$R[\cos\theta_1 + (\beta_1/\alpha_1)\sin\delta_1\sin2\theta_1/\cos2\delta_1] + T\cos\theta_2 = \cos\theta_1 + \beta_1\sin\delta_1\sin2\theta_1/(\alpha_1\cos2\delta_1) \quad (10a)$$

$$R[\cos2\delta_1 + (\beta_1/\alpha_1)^2\tan2\delta_1\sin2\theta_1] - T\rho_2\alpha_2/(\rho_1\alpha_1) = -\cos2\delta_1 + (\beta_1/\alpha_1)^2\tan2\delta_1\sin2\theta_1 \quad (10b)$$

The solution for R and T from equations (10a) and (10b) provides the P-wave reflection and transmission coefficients for the solid-to-fluid interface. (No S-wave exists in medium 2.)

The divergence, 154 of FIG. 6, $D_v$, can be derived by following along lines similar to those followed by Newman (1973). $D_v$ depends on the offset distance, 49 FIG. 1 obtained from geometry 120 and 124, target depth 142 or 66 on FIG. 3, ray angles generated by the ray tracing algorithm 147, and thickness of the layers 132. For the primary, it is given by the following equation:

$$D_v = (8\pi X/\tan^2\theta_s) \sum_{i=1}^{L} (h_i\tan\theta_i/\cos^2\theta_i) \quad (11)$$

In this equation, $\theta_s$ is the ray angle in the first layer, X is offset distance, L is the total number of layers on top of the target layer, and $h_i$ is the thickness of the $i^{th}$ layer.

The transmission loss, 152 in FIG. 6, can be quantified by using the transmission coefficient at each boundary. If the downgoing transmission coefficient between layer i and i+1 is $T_{i,i+1}$ and the upgoing transmission coefficient is $T_{i+1,i}$, then the decrease in amplitude for this interface is the product $T_{i,i+1} T_{i+1,i}$. This loss is determined from the P-wave velocities 134, S-wave velocities 136, and densities 138 for the two layers that define the interface. Transmission loss, $L_t$, is the total loss for all the interfaces along the entire primary ray path and is given by the following equation:

$$L_t = \left[ \prod_{i=1}^{L-1} T_{i,i+1}T_{i+1,i} \right]^{-2} \quad (12)$$

The respective transmission coefficients for the downgoing and upgoing primary ray path can be found from equations (8), (9), or (10) depending on type of interface encountered.

The Q-loss, 156 in FIG. 6, represents the loss due to dissipation of seismic energy into heat. The amplitude change in a particular layer is assumed to be exponential. The total loss, $L_Q$, associated with the two-way propagation through all the layers for the primary is given by the following equation:

$$L_Q = \left[ \prod_{i=1}^{L} e^{[(\pi f/(Q_i a_i)(2h_i/\cos\theta_i)]} \right]^2 \qquad (13)$$

where the subscript i corresponds to the $i^{th}$ layer. In practice, seismic data is used for estimating an effective attenuation constant Q value for returns from the target depth. This effective Q is then assumed for all the layers in the subsurface, i.e., $Q_i=Q$ (all i except i=1).

The received energy density, 158 in FIG. 6, can then be calculated by placing the results of equations (2), (4), (5), (11), (12), (13), and (8), (9), or (10) into:

$$E_p(f) = \frac{E(f)A_c(\theta_H, \phi_H, f)D(\theta_s, \phi_s, f)R_T^2}{D_v L(f)} \qquad (1)$$

Since the primary is calculated without the interbed multiple affect the loss factor L(f) is the product of transmission loss $L_t$ and Q-loss.

Once the primary's received energy density is determined, its corresponding amplitude spectrum 160 will be calculated.

Received energy density can be scaled into an amplitude spectrum through knowledge of the load impedance. FIG. 7 shows an equivalent circuit for the receiving system. $Z_H(f)$ 200 and $Z_L(f)$ 202 are the hydrophone array and load impedances, respectively, with $\epsilon(f)$ 204 being the frequency spectrum of the emf generated by the pressure at the hydrophone array. The following equation reveals the relationship between the primary's received energy density and its voltage amplitude spectrum, $|A_p(f)|$:

$$|A_p(f)|^2 = \frac{E_p(f)|Z_L(f)|^2}{2Re(Z_L)} \qquad (14)$$

All frequencies across the seismic band must be considered in order to fully calculate the primary's amplitude spectrum.

The primary's phase spectrum, $\phi_p(f)$, is calculated independently from the seismic range equation as indicated in block II (96 FIG. 5). The primary's phase, $\phi_p(f)$, is determined from (1) the phase, $\phi_o(f)$, of the source pulse along the primary ray path, 51 FIG. 2, (2) the phase spectrum, $\phi_Q(f)$, of the Q-loss (assumed to be minimum phase) 54 FIG. 2, (3) reflection coefficient ($\phi_T=0$ or $\pi$) 55 FIG. 2, and (4) the hydrophone array sensitivity, the hydrophone and load impedances, and effect of the hydrophone array image which together determine $\phi_c(f)$, 57 FIG. 2.

It is assumed that the hydrophone array is composed of small noninteracting elements that form a linear symmetrically weighted array, which is almost universally always employed. By itself such an array provides a zero phase correction to the wavelet. Hence, no phase correction is required for the hydrophone array itself (or the image array). FIG. 7 shows the equivalent circuit. The primary's phase is given by the following equation:

$$\phi_p(f) = \phi_\epsilon(f) + \text{phase}[Z_L(f)] - \text{phase}[Z_L(f) + Z_H(f)] \qquad (15)$$

where $\phi_\epsilon(f)$ 204 is the phase spectrum of the electromotive force generated by the primary. Even though the load 202 and hydrophone array 200 impedances can be determined for any particular receiving system, it is still necessary to determine the phase spectrum of the electromotive force. It is determined by the phase spectrum, $\phi_o(f) + \phi_Q(f) + \phi_T$, of the pressure pulse incident on the hydrophone array, $A(\phi_H,\phi_H,f)$, the phase spectrum, $\phi_s(f)$, of hydrophone array's sensitivity $S_H(f)$, and a phase correction due to the presence of the image array.

Figure 9:
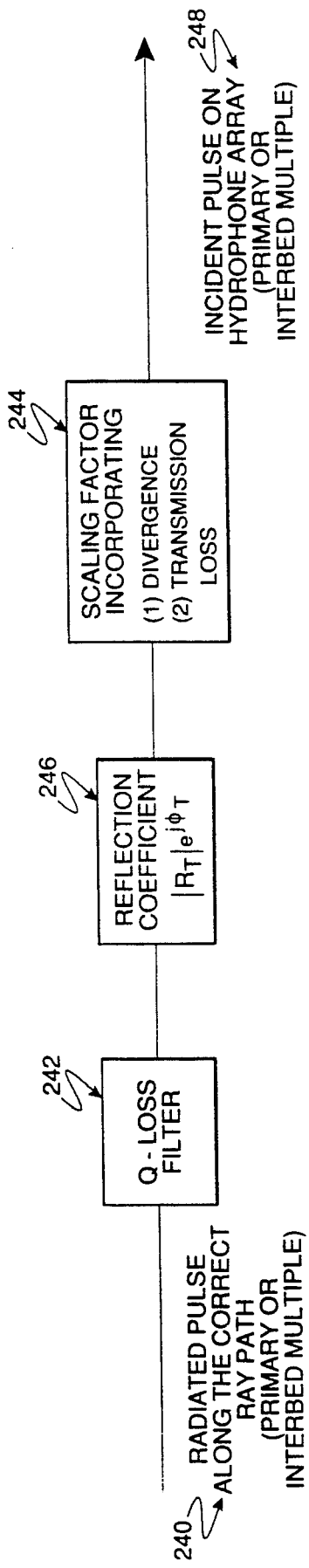
FIG. 9 is a block diagram showing the effects of the earth's filtering on a primary or an interbed multiple.

The incident pressure pulse's phase spectrum (phase of $A(\theta_H,\phi_H(f))$, is different from that radiated by the source pulse array along the $\theta_s,\phi_s$ direction due to the Q-loss (assumed to be minimum phase). The far-field source pulse in the ocean has been derived previously (Duren 1988). Its frequency spectrum, $A(\theta_s,\phi_s,f)$, depends on the individually radiated waveforms from the elements comprising the array, the array geometry, angular direction, and any firing delays among the individual elements. FIG. 9 shows the far-field source pulse 240 being filtered by a Q-loss filter 242, reflection coefficient 246, and scaled 244 to yield 248, the incident primary pulse on the hydrophone array $(A(\theta_H, \phi_H,f))$. The phase contribution of the Q-filter can be derived from the Q-loss assuming the earth is a minimum phase filter. The phase $\phi_T$ depends on the sign of the reflection coefficient. The scale factor represents the scaling contributions of the divergence and transmission loss factor and for the primary is represented by:

$$\text{Scale} = \frac{1}{\sqrt{D_v L_t}} \qquad (16a)$$

The total pressure on the hydrophone array is the sum of the upgoing pressure pulse and the downgoing pressure pulse reflected off the ocean surface. Hence, the phase of the electromotive force is given by the following equation:

$$\phi_\epsilon(f) = \phi_o(f) + \phi_Q(f) + \phi_s(f) + \text{phase}[1 - e^{-j4\pi fd_H \cos\phi_H/V}] \qquad (16b)$$

where $d_H$ is the cable depth and phase [ ] means phase of the enclosed quantity. The last term on the right-hand side is the phase correction due to the array image. The primary's phase is then determined by using equation (16b) to find the phase of the electromotive force and then substituting that result into equation (15).

Referring back to FIG. 5, the primary's frequency spectrum, $A_p(f)$, is given by the following equation:

$$A_p(f) = \text{sqrt}\left[ \frac{E_p(f)|Z_L(f)|^2}{2Re(Z_L)} \right] e^{j\phi_p(f)} \qquad (17)$$

Once this frequency spectrum is generated and if the user has chosen not to include the interbed multiples, the program will stop 100, and the primary can be used. For a primary only calculation we sometimes set $\phi_T=0$ and call that a normal polarity primary. If the user choses to include interbed multiple loss, then block III 102 will be executed.

Interbed multiples are of concern because of the fact that at each interface some energy is reflected. Reflected energy such as this can be reflected again, end up at the offset of interest, and "interfere", either constructively or destructively, with the primary. The treatment here is a "second order" formulation. This means that any particular interbed multiple will experience two additional reflections compared with the primary.

FIG. 3 shows the ray path geometry for the primary signal ray. Without any interbed multiple interference the wavelet frequency spectrum is $A_p(f)$ from equation (17).

Figure 10A:
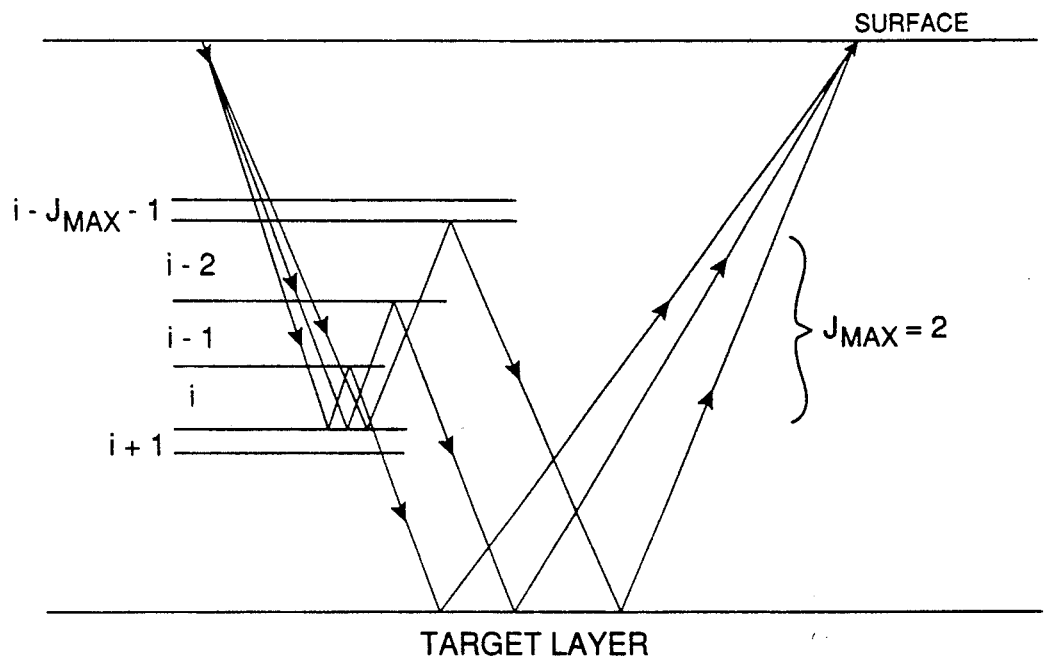
FIG. 10 is a diagram of the downgoing secondary interbed multiples used in accordance with this invention.
FIG. 10b is a diagram of the upgoing secondary interbed multiples used in accordance with this invention.

Now consider FIG. 10a which illustrates "downgoing" interbed multiples first reflected off the $i^{th}$ layer and then reflected again by a layer above the $i^{th}$ layer. Before being reflected again this ray crosses J interfaces. After being reflected again the ray eventually ends up being incident on the hydrophone array. It is assumed that the same number of different interbed multiples will be generated at each interface. This number is designated by $J_{max}+1$.

Figure 10B:
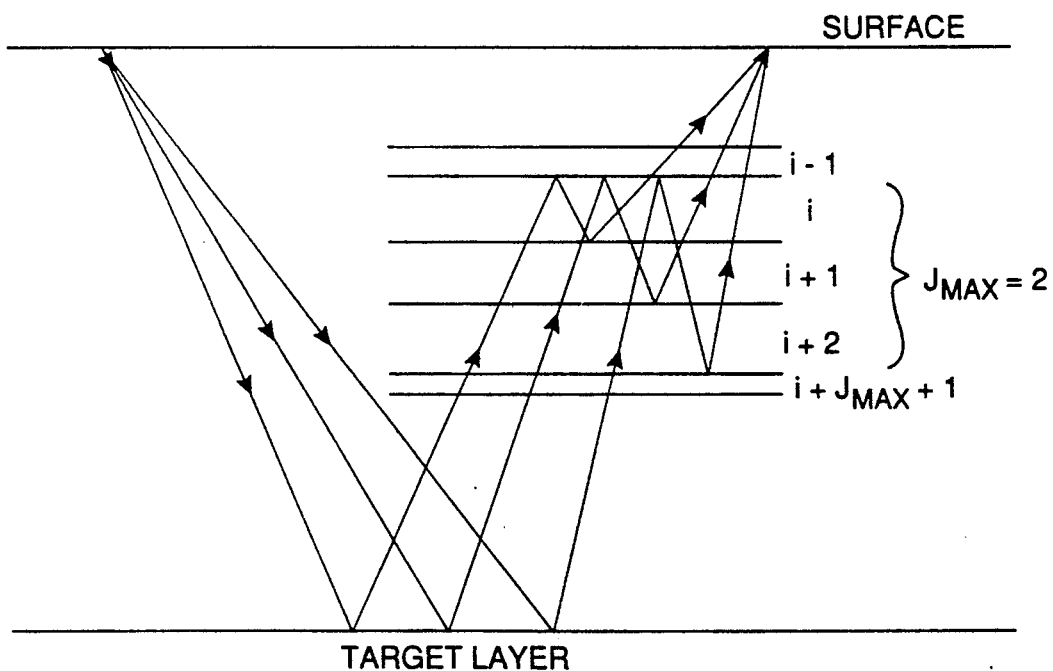

Also included in this second order approximation are the similar effects associated with the "upgoing" interbed multiple like those illustrated in FIG. 10b.

Figure 11:
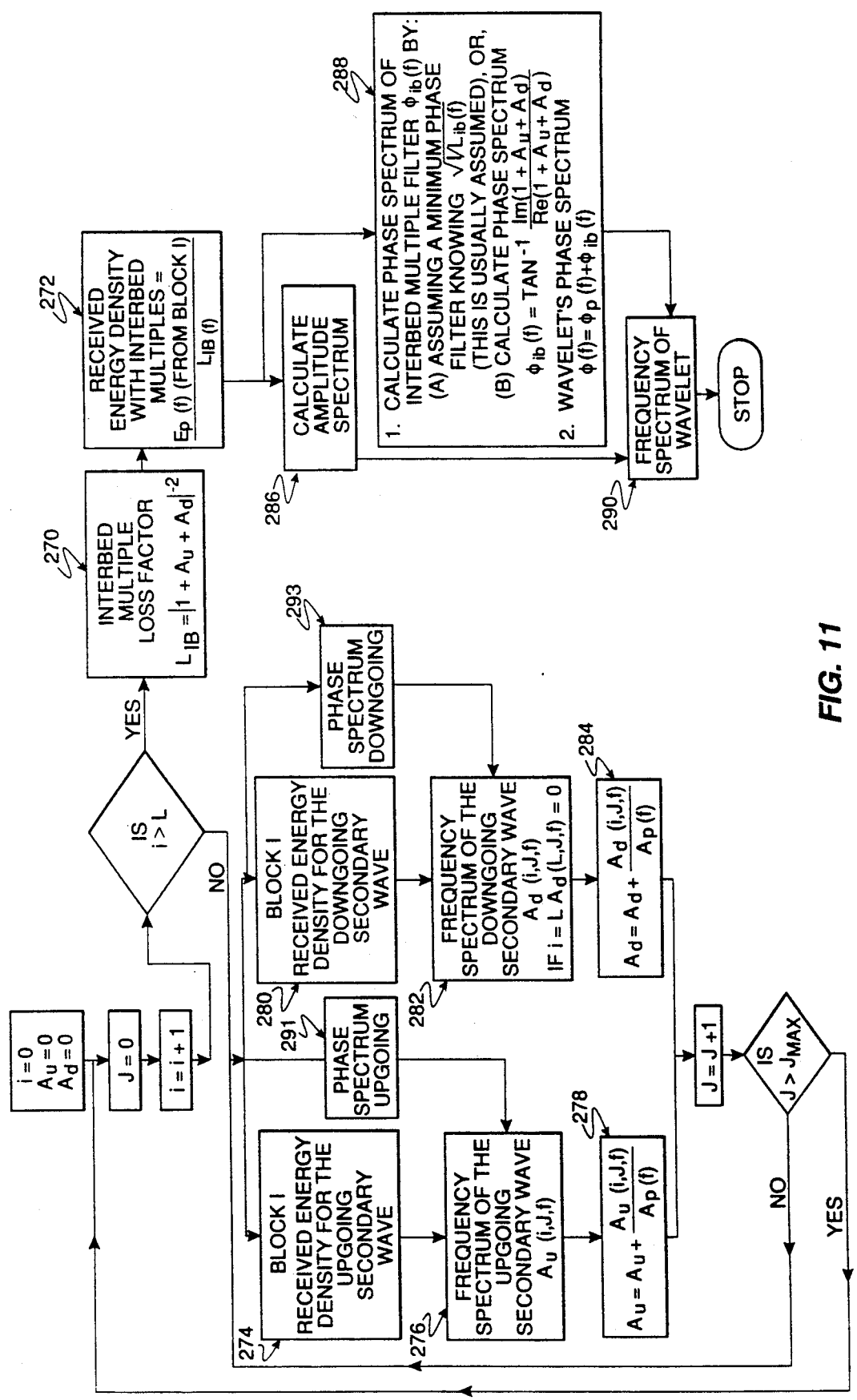
FIG. 11 is a block diagram illustrating the interbed multiple and wavelet frequency spectrum computations, block III in FIG. 5.

FIG. 11 shows a block diagram of a program to compute the interbed multiple loss $L_{ib}(f)$. The equation for the interbed multiple loss is:

$$L_{ib}(f) = \left| 1 + \sum_{i=1}^{L-1}\sum_{J=0}^{J_{max}} A_d(i,J,f)/A_p(f) + \sum_{i=1}^{L}\sum_{J=0}^{J_{max}} A_u(i,J,f)/A_p(f) \right|^{-2} \quad (18)$$

This loss has to be computed for each frequency over the seismic band. $A_d(i,J,f)$ 282 and $A_u(i,J,f)$ 276 are the frequency spectrums of the downgoing and upgoing interbed multiples, respectively, generated by the $i^{th}$ layer, and penetrating J interfaces before being reflected again. The corresponding equations are:

$$A_d(i,J,f) = R_d(i, i+1)R_d(i-J, i-J-1) \times \quad (19)$$

$$\text{sqrt}\left[\frac{E_d(i,J,f)|Z_L(f)|^2}{2\text{Re}(Z_L)}\right]e^{j\phi_d(i,J,f)}$$

$$A_u(i,J,f) = R_u(i, i-1)R_u(i+J, i+J+1) \times \quad (20)$$

$$\text{sqrt}\left[\frac{E_u(i,J,f)|Z_L(f)|^2}{2\text{Re}(Z_L)}\right]e^{j\phi_u(i,J,f)}$$

$R_d(i,i+1)$ is the downgoing reflection coefficient off the interface separating the i and i+1 layers, and $R_d(i-J,i-J-1)$ is the upgoing reflection coefficient off the interface separating layers $i-J$ and $i-J-1$ as shown in FIG. 10a. $E_d(i,J,f)$ is the received energy density for this downgoing interbed multiple. $R_u(i,i-1)$ is the upgoing reflection coefficient off the interface separating the i and i−1 layers, and $R(i+J,i+J+1)$ is the downgoing reflection coefficient off the interface separating layers $i+J$ and $i+J+1$ as shown in FIG. 10b. $E_u(i,J,f)$ is the received energy density for this upgoing interbed multiple. These values are found using the seismic range equation and analogous phase calculations used to evaluate the primary, but with some differences in the details. First, the ray path through the subsurface is different. This means that divergence, transmission loss, Q-loss, and phase should be evaluated for the ray path traveled. Further, the incidence angle off the target interface will be different from that 70 shown in FIG. 3. For large numbers of small beds and small $J_{max}$ we expect that: (1) $L_{ib}(f)$ approximately depends only on the subsurface, and (2) $\phi_d(i,J,f)-\phi_p(f)$ and $\phi_u(i,J,f)-\phi_p(f)$ approximately depend only on travel time differences.

In order to calculate the amplitude spectra, the corresponding received energy density (274 and 280, FIG. 11) must be derived using the seismic range equation, block I. All the required inputs remain the same as for the primary with the addition of a $J_{max}$ to the ray tracing algorithm 147 FIG. 6. Once the ray path for an interbed multiple (similar to those shown in FIG. 10) has been determined for a given layer i and J, the program will calculate the received energy density 158 FIG. 6.

The radiated energy density E(f) 146 value for each interbed multiple is the same as the value for the primary wavelet because E(f) is independent of ray path.

The directivity 148 for an interbed multiple is calculated from equation (4) for the corresponding ray angle $\theta_1$.

Capture area 150 for an interbed multiple is calculated using equations (5), (6) and (7) for corresponding ray angle $\theta_1$.

The target reflection coefficient 152 for an interbed multiple is calculated using equations (8), (9), or (10) for corresponding ray angle incident on the target's interface.

The divergence 154 for an upgoing and downgoing multiple is calculated as follows:

$$D_{vu}(\text{upgoing}) = (8\pi X/\tan^2\theta_1)\left[\sum_{i=1}^{L} h_i\tan\theta_i/\cos^2\theta_i + \sum_{j=0}^{J} h_{i+j}\tan\theta_{i+j}/\cos^2\theta_{i+j}\right] \quad (21)$$

$$D_{vd}(\text{downgoing}) = (8\pi X/\tan^2\theta_1)\left[\sum_{i=1}^{L} h_i\tan\theta_i/\cos^2\theta_i + \sum_{j=0}^{J} h_{i-j}\tan\theta_{i-j}/\cos^2\theta_{i-j}\right] \quad (22)$$

These equations are used to determine the divergence for a specific layer i and a selected J.

The transmission loss 152 for the upgoing and downgoing multiple is calculated as follows:

$$L_{tu} = \left[\prod_{i=1}^{L-1} T_{i,i+1}T_{i+1,i}\right]^{-2}, J = 0 \quad (23a)$$

$$L_{tu} = \left[\prod_{i=1}^{L-1} T_{i,i+1}T_{i+1,i}\right]^{-2}\left[\prod_{j=0}^{J-1} T_{i+j,i+j+1}T_{i+j+1,i+j}\right]^{-2}, \quad (23b)$$

$$J > 0$$

$$L_{td} = \left[\prod_{i=1}^{L-1} T_{i,i+1}T_{i+1,i}\right]^{-2}, J = 0 \quad (24a)$$

$$L_{td} = \left[\prod_{i=1}^{L-1} T_{i,i+1}T_{i+1,i}\right]^{-2}\left[\prod_{j=0}^{J-1} T_{i-j,i-j-1}T_{i-j-1,i-j}\right]^{-2}, \quad (24b)$$

-continued $$J > 0$$

The actual transmission coefficients are found from equations (8), (9) or (10) for corresponding ray angles.

Lastly, the Q-loss 156 for both the upgoing and downgoing interbed multiples is calculated from:

$$L_{Qu} = \left[ \prod_{i=1}^{L} e^{[\pi f/(Q_i a_i) 2h_i / \cos\theta_i]} \right]^2 \times \left[ \prod_{j=0}^{J} e^{[\pi f/Q_{i+j} a_{i+j}) 2h_{i+j} / \cos\theta_{i+j}]} \right]^2 \quad (25)$$

$$L_{Qd} = \left[ \prod_{i=1}^{L} e^{[\pi f/(Q_i a_i) 2h_i / \cos\theta_i]} \right]^2 \times \left[ \prod_{j=0}^{J} e^{[\pi f/Q_{i-j} a_{i-j}) 2h_{i-j} / \cos\theta_{i-j}]} \right]^2 \quad (26)$$

Once the results from equation (2), (4), (5), (6), (7) and (8), (9) or (10) and (21), (22), (23), (24), (25) and (26) for the specific interbed multiple are combined to give the received energy density 158 (FIG. 6) the corresponding amplitude spectrum $|A_u(i,J,f)|$ and $|A_d(i,J,f)|$ 276 and 282 (FIG. 11) is determined using equation (14) for the interbed multiple instead of the primary.

The phase of the interbed multiples (291 and 293, FIG. 11) is calculated like the primary, using equation (15). It is important to remember that when an interbed multiple is going to be used in calculating interbed multiple loss its phase and the primary's must be calculated in a manner to account for the difference in the travel times.

The calculated phase spectra are then combined with corresponding amplitude spectra and reflection coefficients (determined from equation (8), (9) or (10) for the downgoing and upgoing interbed multiples) into equations (19) and (20) to give the corresponding frequency spectra 276 and 282 (FIG. 11).

The results of equations (19) and (20) are combined with equation (17) (278 and 284, FIG. 11) and placed into equation (18) (270, FIG. 11) to determine the interbed multiple loss.

From FIG. 11, interbed multiple loss factor is divided into the received energy density of the primary 272 to produce the received energy density including the interbed multiples. The frequency spectrum of this wavelet 290 is found from the combination of the amplitude spectrum 286, $|A(f)|$, found from equation (14) using $E_r(f)$ instead of $E_p(f)$ and the phase spectrum 288 found by assuming minimum phase for the interbed multiple filter (56 FIG. 2) or by deterministically calculating $\phi_{ib}(f)$ (56 FIG. 2), using the interbed multiple and superposition.

The wavelet (normal polarity), either with or without the interbed multiples when convolved with the reflection coefficient sequence for hypothetical beds represents a model trace of unprocessed seismic data. Different forms of the wavelet are used in different seismic applications.

In an AVO analysis the frequency spectrum of the wavelet is used to process seismic data into a form where the data directly represents the reflection coefficient. The validity of the analysis depends on the correlation between seismic amplitudes and their reflection coefficients and how well the wavelet has been modeled.

Figure 12A:
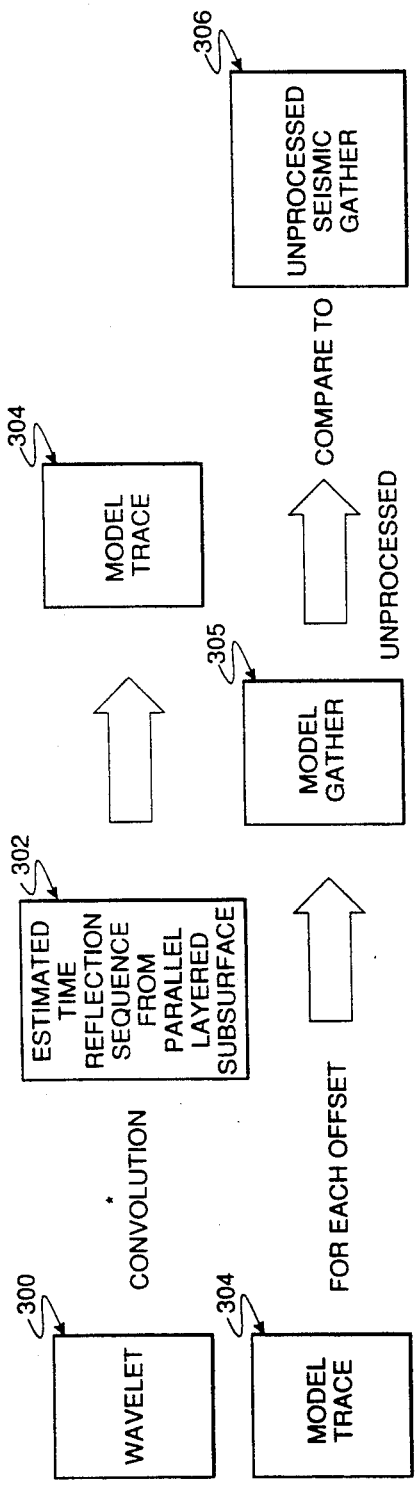
FIG. 12 is a block diagram of the application of the seismic range equation wavelet in an enhanced AVO analysis, wherein a model gather is generated from the seismic range equation wavelet for comparison with an unprocessed seismic gather, in accordance with the preferred embodiment of this invention.
FIG. 12b is a block diagram of the application of the seismic range equation wavelet in an enhanced AVO analysis, wherein a model gather is processed and compared to a processed seismic gather, in accordance with the preferred embodiment of this invention.
Figure 12B:
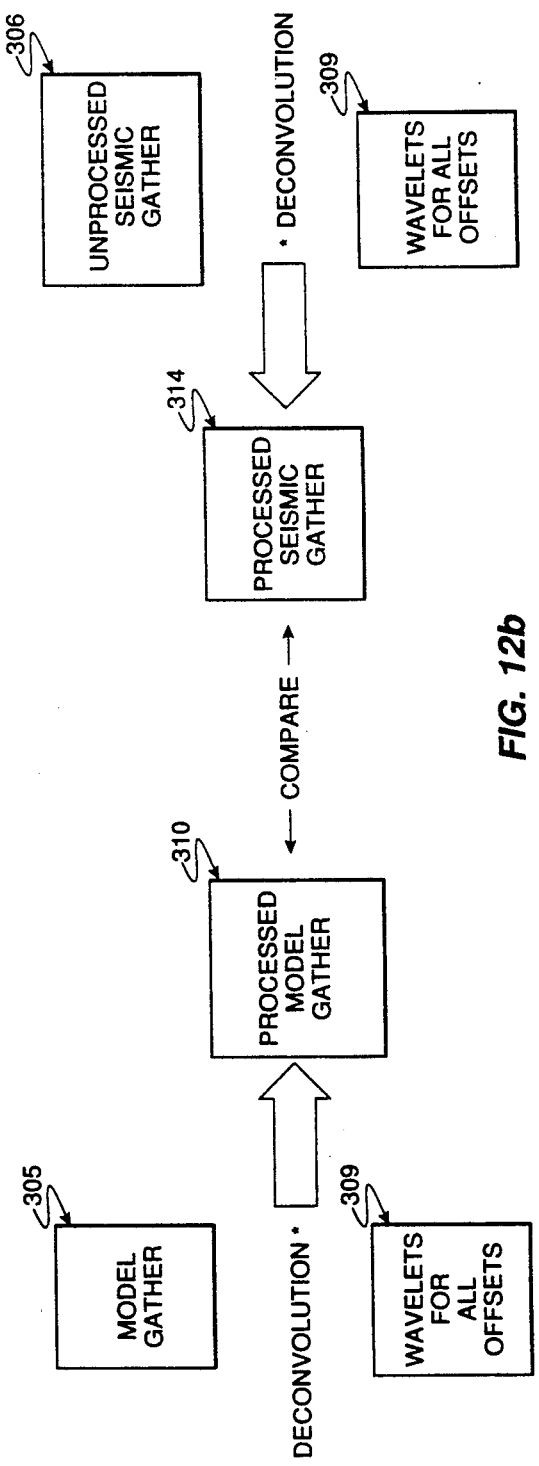

Referring now to FIG. 12, a block diagram of an enhanced Amplitude Versus Offset (AVO) analyses, a model trace 304 is formed by convolving a calculated wavelet 300 with a hypothetical time-reflection sequence 302, which was developed from parallel layered subsurface. Each time-reflection pair is found by determining the ray path to an interface and then calculating the travel time and reflection coefficient for that interface. This has to be repeated for many interfaces to establish a time-reflection sequence for the particular offset under consideration. This procedure is repeated for each offset using the same reflection coefficient value (152 FIG. 6) to form a model gather.

Figure 13A:
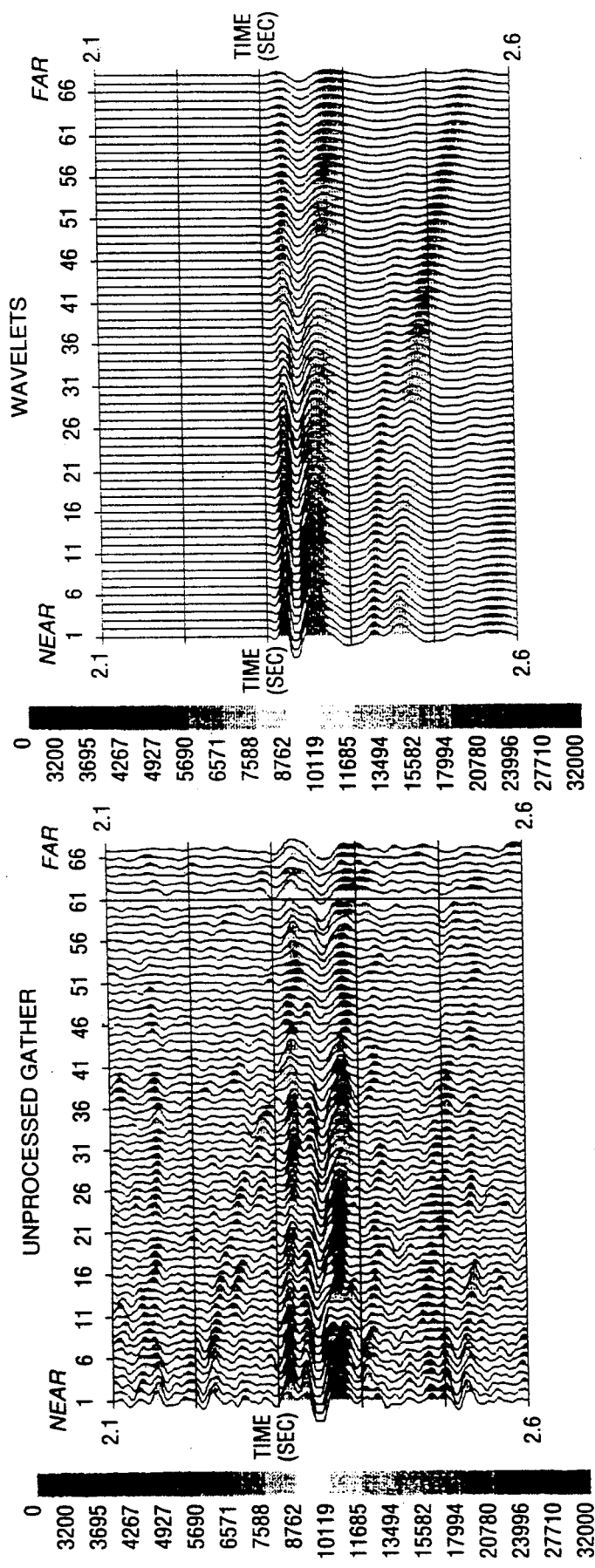
FIG. 13a shows a comparison of actual unprocessed data to seismic range equation range wavelets generated in accordance with this invention.

The model traces, for a common depth point (CDP), are aligned according to offset, to produce an unprocessed model gather 305 for a target with suspected physical properties. The model gather 305 and seismic gather 306 are then compared. FIG. 13a shows an example of a seismic gather 306 at a well location, before AVO corrections and the corresponding wavelets 309, calculated from well data at that gather location and the corresponding system parameters. A gas sand is evident just below 2.3 seconds on the unprocessed data. The wavelet amplitudes fall off with increasing offset as expected since the losses are greater at the larger offsets.

Figure 13B:
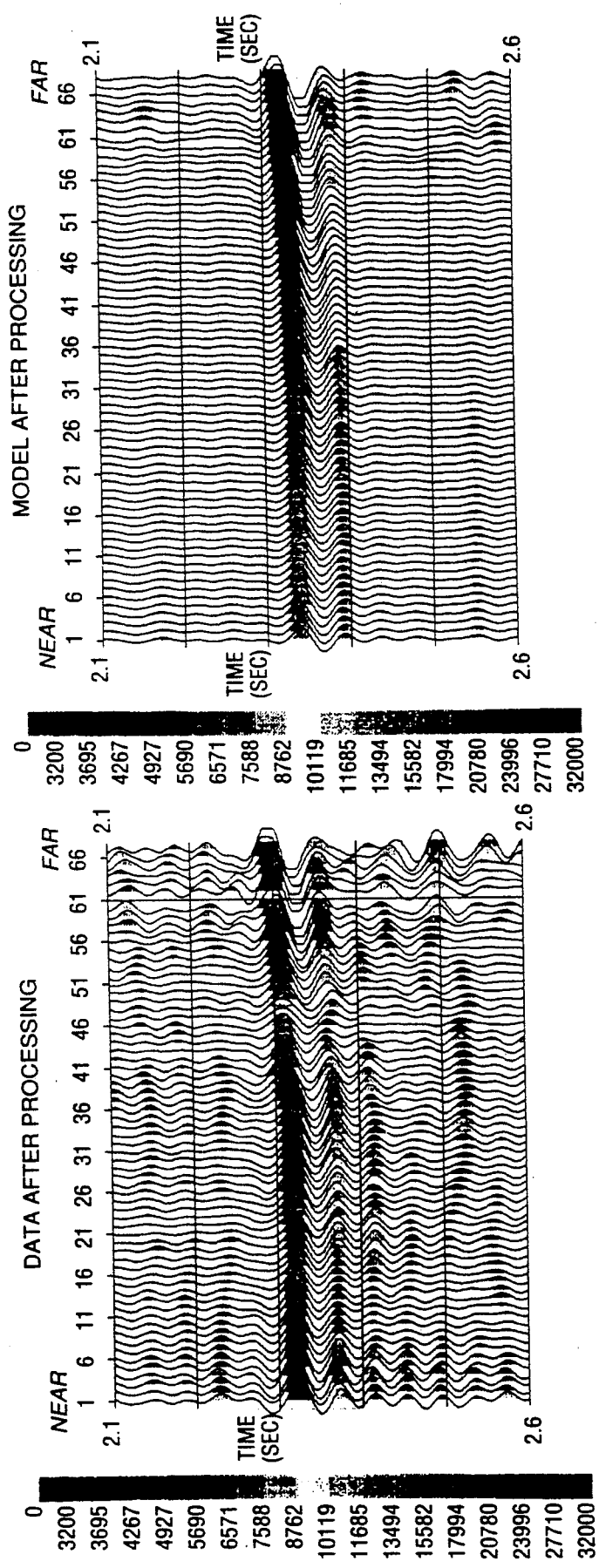

Referring back to FIG. 12b, the model gather 305 and seismic data gather 306 can be processed in such a way, using the wavelets 309, so that they are reduced to the seismic representation of the reflection coefficient 310 and 314 seen at the offset. The processing referred to is the deconvolution of the model and seismic data by the wavelet. FIG. 13b shows the seismic gather and the model gather after deterministic pre-stack deconvolution using the wavelets shown in 13a as the known wavelet in the seismic data and model. Good agreement is seen on FIG. 13b between the seismic data 314 and model 310. Since the physical properties of the gas sand were known from the well data, the model realistically represents the target beds and good agreement is expected.

In an exploration case, where the physical properties of the target beds are not known, the explorationist must supply these properties. For example, estimation of gas sand, oil sand, and water sand physical properties could be used to generate three different models. The data are compared with all these models to see which model most closely reflects the amplitude versus offset behavior of the data. This is the general forward modeling procedure for amplitude versus offset analysis. This modeling procedure using the theory presented here is different from previous AVO modeling in that unprocessed data is modeled because all offset-dependent effects (losses) are automatically taken into account in the wavelet calculation. The data and model can subsequently be processed alike and are compatable and comparable at any stage of processing.

This modeling technique can also be used on a stacked seismic gather. But the model gather must also be stacked before comparison with the data.

The usefulness of the seismic range equation is evident from this preferred embodiment. First, the equation can be used to generate a model gather of unprocessed data used in comparisons with the unprocessed seismic data. Secondly, the equation is used to produce the parameters needed to process the model gather and seismic gathers for AVO analysis to make offset-dependent loss corrections to the amplitude and phase.

DESCRIPTION OF ALTERNATE EMBODIMENTS

Even though the AVO application is a significant contribution to seismic data analysis, the seismic range equation can be utilized as effectively in other aspects of seismic exploration.

In an alternate AVO application, the seismic range equation can be used to calculate only the average amplitude compensation of the seismic data instead of both amplitude and phase. The seismic data is corrected only for the offset varying portion of the equation of the received energy density averaged over a frequency band of interest. This can be done by an amplitude only, zero phase filtering, technique or an average amplitude correction technique. The average amplitude correction technique is unique in that a correction factor, used to process data, is determined from the ratio of the value of the average amplitude spectrum for a wavelet at a far offset, to the value of the average amplitude spectrum for a wavelet at a near offset. Therefore, the only offset variation left in the data should be the reflection coefficient variation. This is an approximate solution to the more rigorous solution explained in the preferred embodiment.

Another useful application is improving resolution of stratigraphy via post-stack deterministic deconvolution. Each prestack wavelet is moved out and then stacked to develop a wavelet for post stack deconvolution. The following is included to further illustrate the usefulness of this invention.

Figure 14A:
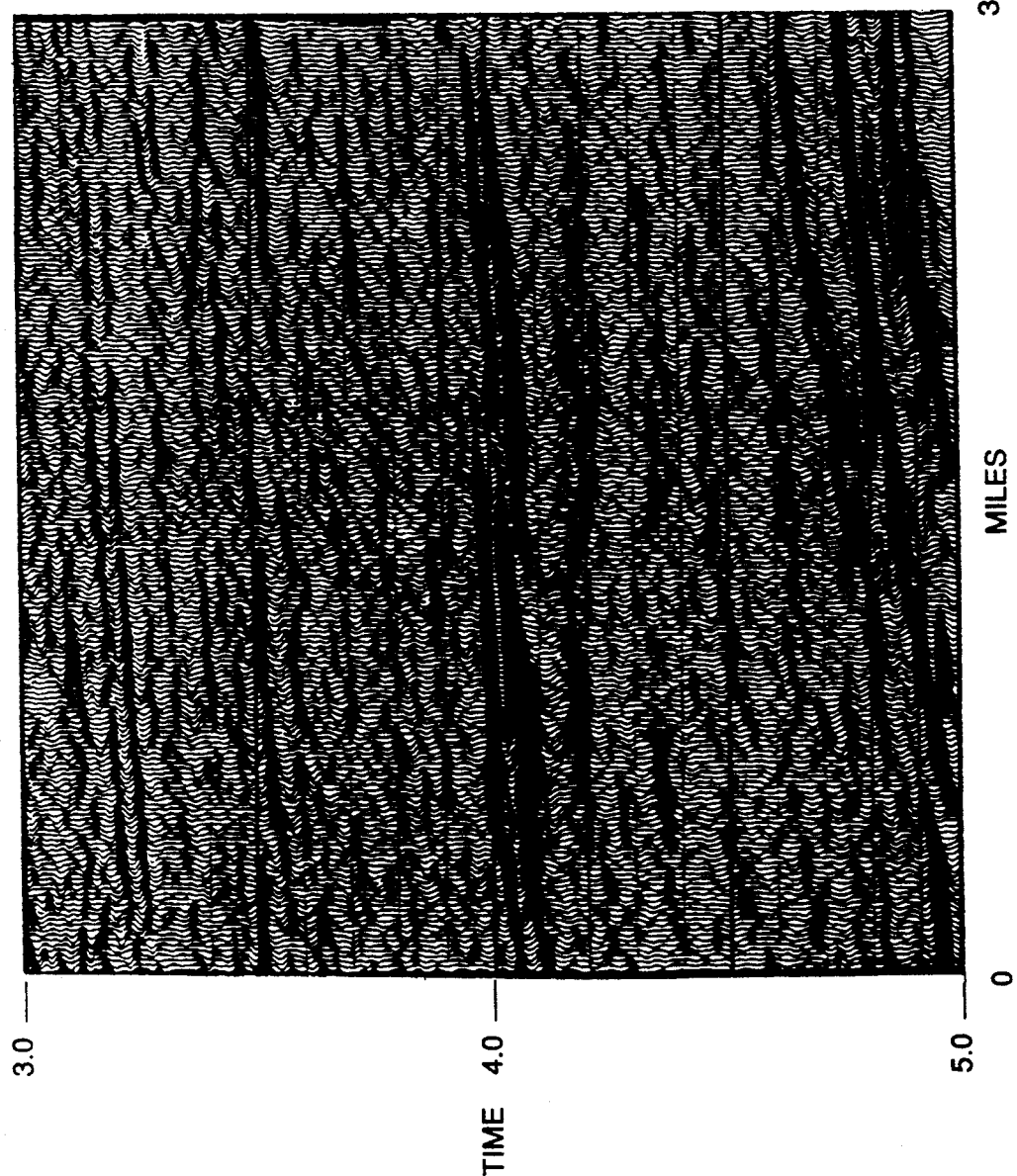
FIG. 14a shows a basic stacked seismic data section.
Figure 14B:
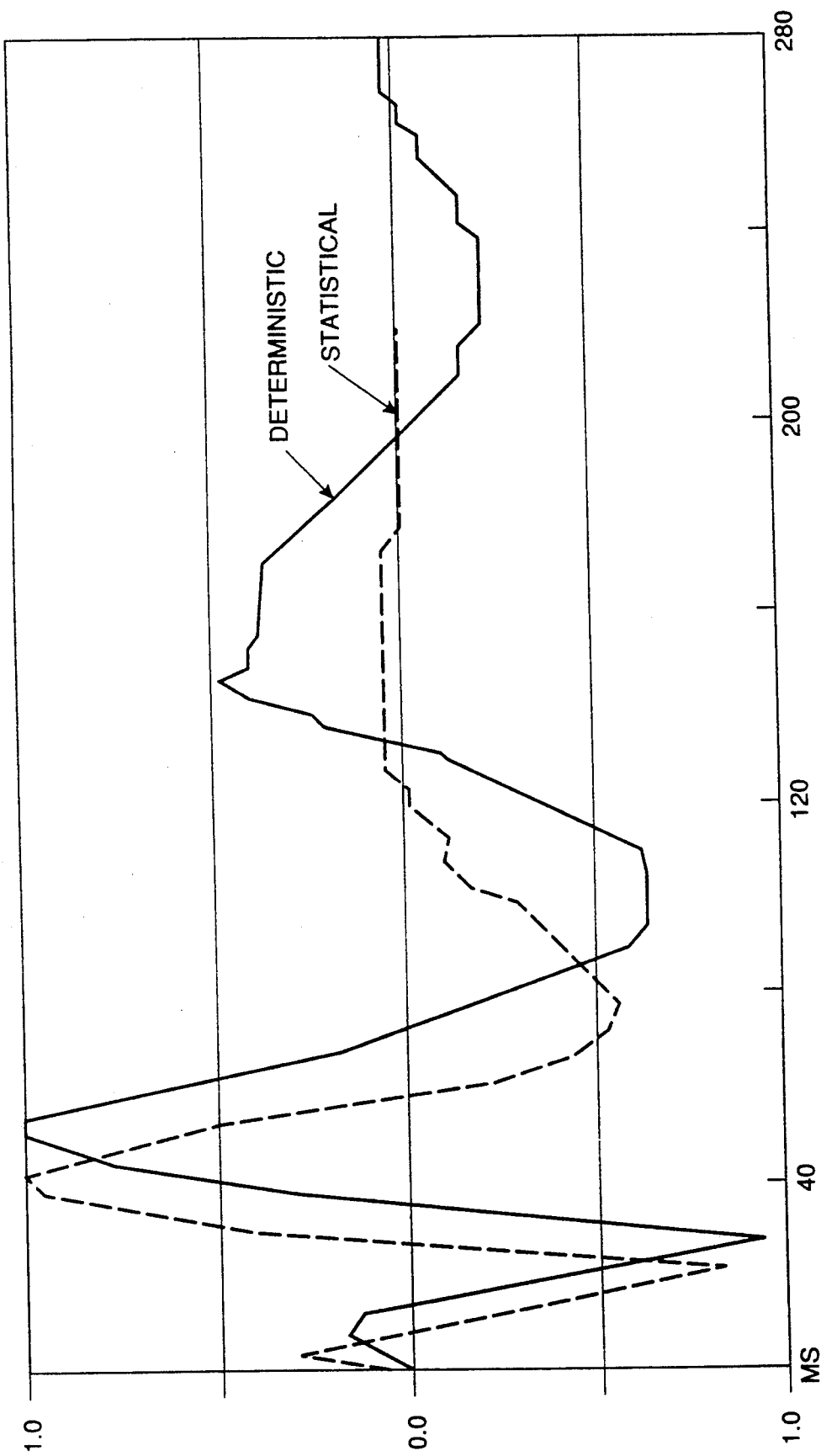
FIG. 14b shows a diagrammatic representation of statistically estimated seismic wavelet and a deterministically calculated stack wavelet.

FIG. 14a shows a basic stacked seismic section. The maximum fold is 90. The zone of interest is at 4.0 seconds at the center of the section. FIG. 14b shows a statistically estimated wavelet and the deterministically calculated stacked wavelet superimposed on one another. Good agreement is seen! The calculated wavelet does have a low frequency tail that is missing from the statistical estimate. The statistical approach has demonstrated difficulty at the low frequencies so this difference is not alarming.

The statistical approach used is capable of estimating mixed phase wavelets. The approach utilizes the fourth-order cumulant as suggested in *Annals of Mathematical Statistics*, Vol 36, published in 1965 at pages 1351-1374, in an article entitled, "An Introduction Polyspectra", D. R. Brillenger. Cumulant functions are generalizations of autocorrelation functions, and even though autocorrelations do not depend on the data's phase higher order statistical functions like the forth-order cumulant do depend on data's phase. The approach allows a mixed phase estimate for the wavelet.

Figure 14C:
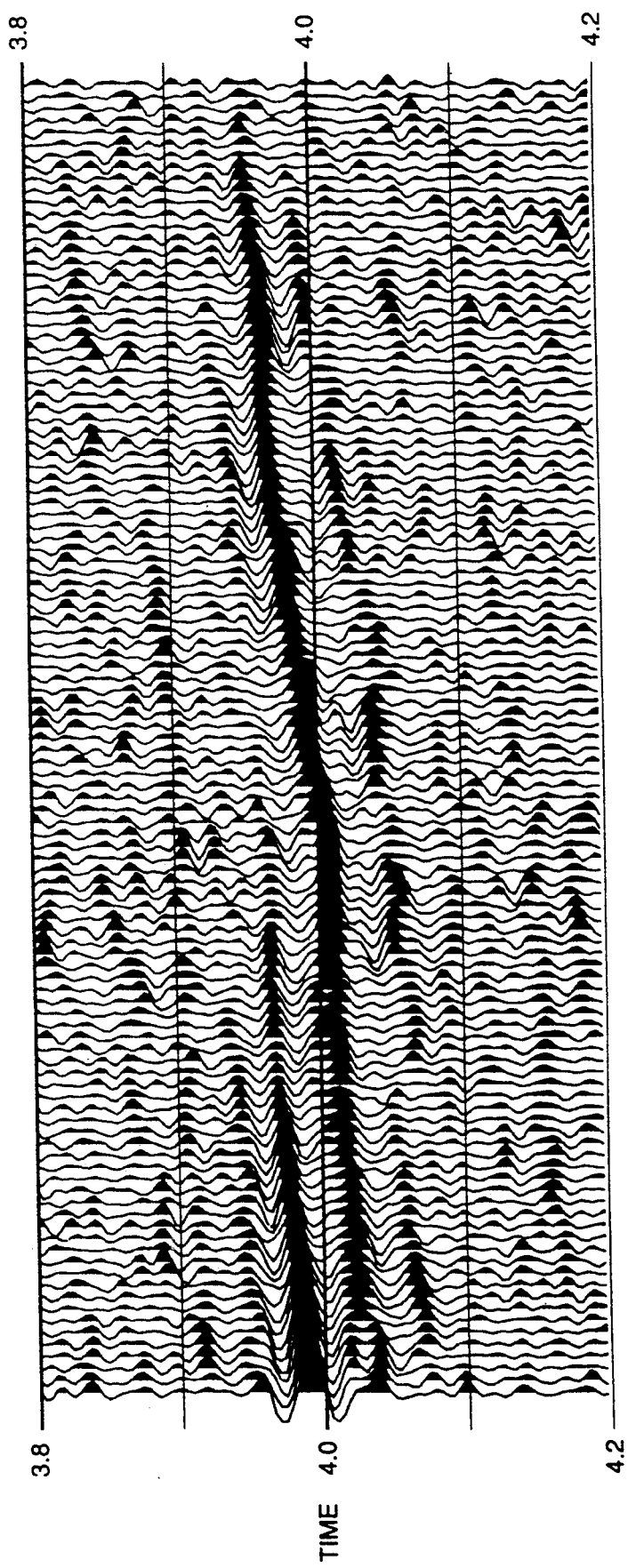
FIG. 14c shows actual output data for a zone of interest using the deterministic wavelet.
Figure 14D:
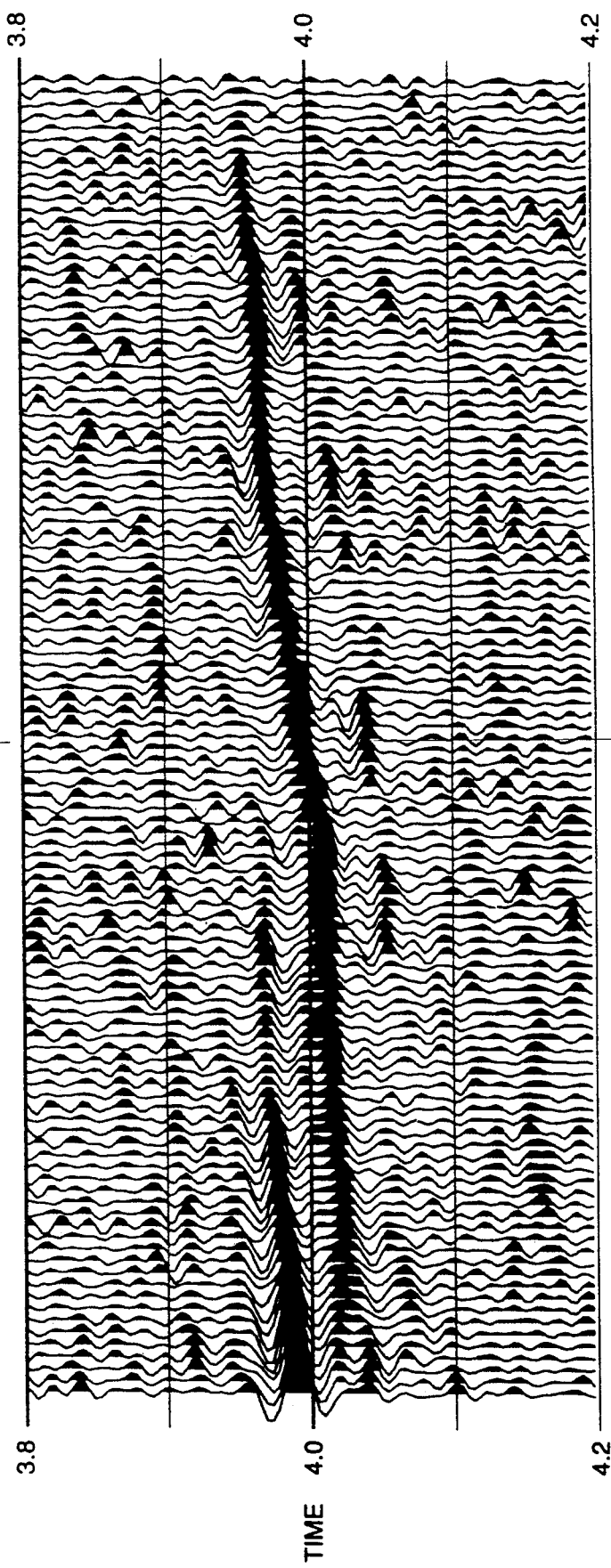
FIG. 14d shows the actual data for a zone of interest using a statistical wavelet.

FIG. 14c and FIG. 14d show the output data for the zone of interest using the deterministic and statistical wavelet, respectively. The weaker events below 4.0 seconds are stronger on FIG. 14C. Also the weaker event at 3.94 seconds on the right hand side of FIG. 14c is much stronger and better defined than what is shown on FIG. 14d.

The seismic range equation will also be beneficial in data gathering systems analysis. The basis for comparison of proposed systems would be the calculated received energy density or the wavelet's frequency spectrum. This comparison allows the more appropriate system to be selected based on the application at hand.

Another alternate use of the seismic range equation is in the area of system design. The equation can be inverted and solved for the data gathering system required to obtain the desired energy density for a prescribed target and subsurface. These results can be used in conjunction with a cost analysis to determine the most cost effective data gathering system for the application at hand. This is analogous to the radar problem of determining the most cost effective solution for a required power-aperture product.

While a particular embodiment of the invention has been shown and described and other embodiments have been discussed, it will be understood that the invention is not limited thereto, since many modifications may be made and will become apparent to those skilled in the art.

What is claimed is:

1. A method of modeling an amplitude spectrum of a seismic wavelet that issues from a seismic source, traverses a medium, is reflected from a target, and is received by a receiving system, said method comprising
determining values for the factors corresponding to the source, the medium, the target, and the receiving system, said factors including radiated energy density, directivity, capture area, target reflection coefficient, divergence, and loss factor, and
combining said values for said factors simultaneously in one concise analytical formulation to produce a model amplitude spectrum of the seismic wavelet.

2. A method, in accordance with claim 1, wherein said model amplitude spectrum is modeled by utilizing the following seismic range equation:

$$E_p(f) = \frac{E(f)D(\theta_s, \phi_s, f)A_c(\theta_H, \phi_H, f)R_T^2}{D_v L(f)}$$

having seven elements wherein:
1) $E(f)$ is the radiated energy density from the source at frequency, f;
2) $D(\theta_s,\phi_s,f)$ is source directivity along the $\theta_s$, $\phi_s$ direction;
3) $A_c(\theta_H,\phi_H,f)$ is the capture area of the receiving system for incident angle $\theta_H,\phi_H$;
4) $R_T$ is the P-wave reflection coefficient of the target interface;
5) $D_v$ is the divergence;
6) $L(f)$ is representative of the losses associated with the subsurface; and
7) $E_p(f)$ is the received energy density at the receiving system, said method comprising
determining the physical subsurface characteristics, for the subsurface layers (i) transversed by the seismic wavelet, including the P-wave velocity ($\alpha_i$), S-wave velocity ($\beta_i$), density ($\rho_i$), and thickness ($h_i$), assuming the seismic wavelet path begins at the source of a seismic data gathering system, at frequency (f), through the medium at ray angle ($\theta_s$) with respect to the normal to the surface and at corresponding ray angles ($\theta_i$) to the predetermined target bed at depth (d), returning through the medium to the receiving system,
determining the parameters of the seismic data gathering system, including, a frequency spectrum of the radiated waveforms from the individual array elements, number of source array elements, said number being at least one, position of the source array elements, when said number of elements is greater than one, value of any firing delays associated with source array elements ($\delta_n$), the value of any receiving array and load impedances ($Z_H(f)$ and $Z_L(f)$), receiving array sensitivity ($S_H(f)$), and the receiving array depth ($d_H$), calculating the radiated energy density E(f), calculating the source directivity $D(\theta_s,\phi_s,f)$, calculating the capture area ($A_c(\theta_H,\phi_H, f)$) along the incident direction at the receiving array, determining the target's power reflection coefficient ($R_T^2$), calculating the divergence ($D_v$) for a given offset, calculating the loss factor (L(f)), dividing the product of the radiated energy density (E(f)), the source directivity $D(\theta_s,\theta_s,f)$, the capture area $A_c(\theta_h,\phi_h,f)$, the target power reflection coefficient ($R_T^2$), by the divergence ($D_v$), and the loss factor (L(f)), to form the received energy density ($E_p(f)$), and deriving said model amplitude spectrum ($|A_p(f)|$) of said model seismic wavelet, for all frequencies across the seismic band, utilizing said received energy density ($E_p(f)$) and said value of any load impedance.

3. A method in accordance with claim 2, wherein said radiated energy density is derived from a number of said source array elements (N), said frequency (f), said seismic velocity of first layer traversed ($\alpha_1$), said density of the first layer transversed ($\rho_i$), and from an illumination factor.

4. A method in accordance with claim 3, wherein said illumination factor ($I_n(f)$) is derived from said frequency spectrum ($A_n(f)$) of the radiated waveforms, said value of any firing delay ($\delta_n$), and said frequency (f).

5. A method in accordance with claim 2, wherein said source directivity is derived from the ratio of said radiated energy density per unit solid angle radiated in a particular direction ($\theta_s,\phi_s$) to said radiated energy density E(f).

6. A method in accordance with claim 2, wherein said capture area is derived from the multiplication of a capture area along an acoustic axis normal to the surface and a transmitting pattern of said receiving array.

7. A method in accordance with claim 6, wherein said capture area along the direction of an acoustic axis normal to the surface, is derived from said receiving array sensitivity $S_H(f)$, said value of any load and receiving array impedances ($Z_L(f)$ and $Z_H(f)$), said density of the first transversed layer, said P-wave velocity of the first transversed layer, and said receiving array depth.

8. A method in accordance with claim 6, wherein said transmitting pattern is defined by the ratio of the receiving array directivity ($D(\theta_H,\phi_H,f)$ along the incident ray direction to a directivity of the receiving array along the acoustic axis ($D(0,\phi_H,f)$).

9. A method in accordance with claim 2, wherein said target's reflection coefficient is derived from the said angle of incidence ($\theta_i$), said seismic velocities ($\alpha_i,\alpha_{i+1},\beta_i$ and $\beta_{i+1}$), and said densities ($\rho_i$ and $\rho_{i+1}$) of layers at the interface.

10. A method in accordance with claim 2, wherein said divergence is derived from said thickness ($h_i$) of subsurface layers transversed by the seismic wavelet, said ray angle ($\theta_i$) in each subsurface layer, and said offset X between source and receiver.

11. A method in accordance with claim 2, wherein said loss factor includes transmission loss ($L_t$).

12. A method in accordance with claim 11, wherein said transmission loss ($L_t$) is the loss associated with crossing the interfaces twice and is derived from the transmission coefficients ($T_{i,i+1}, T_{i+1,i}$) associated with the corresponding layers traversed.

13. A method in accordance with claim 12, wherein said interfaces include solid-to-solid interfaces, a fluid-to-solid interface, and a solid-to-fluid interface.

14. A method in accordance with claim 2, wherein said loss factor includes Q-loss ($L_Q(f)$).

15. A method in accordance with claim 14, wherein said Q-loss is derived from an attenuation constant ($Q_i$) for each transversed subsurface layer, said P-wave velocity ($\alpha_i$) of each transversed subsurface layer, said thickness of each transversed subsurface layer ($h_i$), said frequency (f), and said ray angle ($\theta_i$).

16. A method in accordance with claim 15, wherein said attenuation constant for each said subsurface layer is estimated by finding an effective attenuation constant (Q) down to said target depth from existing seismic data in the area.

17. A method of modeling a phase spectrum of a seismic wavelet that issues from a seismic source, traverses a medium, is reflected from a target, and is received by a receiving system, said method comprising determining phase components of an electromotive force ($\phi_\epsilon(f)$) generated by the seismic wavelet, deriving the value of any phase components of load and receiving array impedances, and combining said phase components of said electromotive force and said load and receiving array impedances to produce a metal phase spectrum of the seismic wavelet.

18. A method in accordance with claim 17, wherein said phase components of said electromotive force $\phi_\epsilon(f)$ are derived from a sum of the phase spectrum of receiver sensitivity $\phi_s(f)$, the phase spectrum of an incident pressure pulse on the receiver array $A(\theta_H,\phi_H, f)$, and a phase contribution due to the presence of the image array, assuming the receiving array is at depth $d_H$.

19. A method in accordance with claim 18, wherein said phase spectrum of a pressure pulse incident on the receiver array is derived from a radiated far-field source pulse phase spectrum $\phi_o(f)$ combined with a phase spectrum contribution of the earth filter.

20. A method in accordance with claim 19, wherein said radiated far-field source pulse is derived from individual frequency spectra $A_n(f)$, element geometry ($r_n$), value of any firing delay ($\delta_n$), and direction $\theta_s$, $\phi_s$.

21. A method in accordance with claim 19, wherein said earth filter includes a Q-loss filter.

22. A method of modeling a frequency spectrum of a seismic wavelet that issues from a seismic source, traverses a medium, is reflected from a target, and is received by a receiving system, said method comprising determining values for factors corresponding to the source, the medium, the target, and the receiving system, said factors including radiated energy density, directivity, capture area, target reflection coefficient, divergence, and loss factor, combining said values for said factors to produce a model amplitude spectrum of the seismic wavelet, determining phase components of an electromotive force ($\phi_\epsilon(f)$) generated by the seismic wavelet, deriving the value of any phase components of load and receiving array impedances, combining said components of said electromotive force and said load and receiving array impedances to produce a model phase spectrum of the seismic wavelet, and combining said model amplitude spectrum with said model phase spectrum to produce a model frequency spectrum of the seismic wavelet.

23. A method of determining the effect of an offset variation in an analog receiving and recording system that would affect a seismic wavelet that issues from a seismic source, traverses a medium, is reflected from a target, and is received by a receiving system, said method comprising determining a capture area along the acoustic axis for a source-to-receiver offset, determining additional capture areas along the acoustic axis for other source-to-receiver offsets, and finding the ratio of said capture area to said additional capture areas and said capture area to determine an offset variation in the analog receiving and recording system.

24. A method of determining a transmitting pattern of a receiving array to show the effect of the receiving array and an image array (or ghost reflection) that affects an amplitude spectrum of a seismic wavelet that issues from a seismic source, traverses a medium, is reflected from a target, and is received by a receiving system, said method comprising determining the directivity of the receiving array along an incident direction, determining the directivity of the receiving array along an acoustic axis, and taking the ratio of said directivity of the receiving array along the incident direction to said directivity of the receiving array along the acoustic axis to determine a transmitting pattern of the receiving array.

25. A method of determining a phase component of an array image that affects a phase spectrum of a seismic wavelet that issues from a seismic source, traverses a medium, is reflected from a target, and is received by a receiving system, said method comprising determining an incident angle of the seismic wavelet, determining a cable depth in water, combining said incident angle and said cable depth in water to provide a time delay associated with the array image, and determining the phase component associated with the array image from said time delay.

26. A method of modeling an amplitude spectrum of a downgoing interbed multiple that would affect a seismic wavelet that issues from a seismic source, traverses a medium, is reflected from a target, and is received by a receiving system, said method comprising determining a ray path of the downgoing interbed multiple that would be received by a seismic data gathering system, determining value for factors corresponding to the source, the medium that would be transversed by the downgoing interbed multiple, the target, and the receiving system, said factors including radiated energy density, directivity, capture area, reflection coefficients, divergence, and loss factor, and combining said values for said factors to produce a model amplitude spectrum of the downgoing interbed multiple.

27. A method of modeling an amplitude spectrum of an downgoing interbed multiple that would affect a seismic wavelet that issues from a seismic source, traverses a medium, is reflected from a target, and is received by a receiving system, said method comprising determining a ray path of the upgoing interbed multiple that would be received by a seismic data gathering system, determining value for factors corresponding to the source, the medium that would be transversed by the upgoing interbed multiple, the target, and the receiving system, said factors including radiated energy density, directivity, capture area, reflection coefficients, divergence, and loss factor, and combining said values for said factors to produce a model amplitude spectrum of the downgoing interbed multiple.

28. A method of modeling a phase spectrum of a downgoing interbed multiple that would affect a seismic wavelet that issues from a seismic source, traverses a medium, is reflected from a target, and is received by a receiving system, said method comprising determining a ray path of the downgoing interbed multiple that would be received by a seismic data gathering system, determining phase components of an electromotive force ($\phi_{68}(f)$) generated by the downgoing interbed multiple, deriving the value of any phase components of load and receiving array impedances, and combining said phase components of said electromotive force and said load and receiving array impedances to produce a model phase spectrum of the downgoing interbed multiple.

29. A method of modeling a phase spectrum of an upgoing interbed multiple that would affect a seismic wavelet that issues from a seismic source, traverses a medium, is reflected from a target, and is received by a receiving system, said method comprising determining a ray path of the upgoing interbed multiple that would be received by a seismic data gathering system, determining phase components of an electromotive force ($\phi_{68}(f)$) generated by the upgoing interbed multiple, deriving the value of any phase components of load and receiving array impedances, and combining said phase components of said electromotive force and said load and receiving array impedances to produce a model phase spectrum of the upgoing interbed multiple.

30. A method for modeling an interbed multiple loss factor that would affect a primary seismic wavelet that issues from a seismic source, traverses a medium, is reflected from a target, and is received by a receiving system, said method comprising selecting a number $J_{max}$ representing a number of subsurface layers an interbed multiple will cross after being reflected once, but before being reflected again, determining a frequency spectrum for the primary seismic wavelet, determining a frequency spectrum for each downgoing interbed multiple associated with each subsurface layer down to a target layer, assuming $J_{max}+1$ interbed multiples will be generated per said subsurface layer, determining a frequency spectrum for each upgoing interbed multiple associated with each subsurface layer down to a target layer, assuming $J_{max}+1$ interbed multiples will be generated per said subsurface, determining downgoing ratios by dividing said frequency spectrum for each downgoing interbed multiple by said frequency spectrum for the primary seismic wavelet, determining upgoing ratios by dividing said frequency spectrum for each upgoing interbed multiple by said frequency spectrum of said primary seismic wavelet, taking the reciprocal of the squared magnitude of the sum of 1, the sum of said downgoing ratios, and the sum of said upgoing ratios (eliminating redundancy) to determine the interbed multiple loss factor.

31. A method in accordance with claim 30, wherein said selecting of said number $J_{max}$ includes assuming a downgoing interbed multiple following a downgoing secondary ray path beginning at the source at ray angle ($\theta_d$), at frequency (f), through a predetermined number of subsurface layers, to layer (i), up through a predetermined number of interfaces (J), down to the target at said depth (d), up through the subsurface layers to the receiving system, and assuming an upgoing interbed multiple following an upgoing secondary ray path beginning at the source at ray angle ($\theta_u$), at a frequency (f), down to the target at said depth (d), up to a predetermined subsurface layer (i), down a predetermined number of interfaces (J), then back up through the subsurface layers to the receiving system.

32. A method for modeling an unprocessed seismic trace, said method comprising determining values for factors corresponding to the source, the medium that would be transversed by a seismic wavelet, the target, and the receiving system that would affect said seismic wavelet, said factors including, source-to-receiver offset, radiated energy density, directivity, capture area, target reflection coefficient, divergence, and loss factor, combining said values for said factors to produce a model amplitude spectrum of said seismic wavelet, determining phase components of an electromotive force ($\phi_\epsilon(f)$) generated by said seismic wavelet, deriving the value of any phase component of load and receiver array impedances, combining said components of said electromotive force and said load and receiver array impedances to produce a model phase spectrum of said seismic wavelet, combining said model amplitude spectrum with said model phase spectrum to produce a model frequency spectrum for a model seismic wavelet for said source-to-receiver offset, determining a time-reflection sequence from a parallel layered subsurface, and convolving said model seismic wavelet with said time reflection sequence to develop a model of the unprocessed seismic trace for said source-to-receiver offset.

33. A method of affecting an enhanced amplitude-versus-offset analysis by comparing unprocessed seismic data and modeled data, said method comprising generating a model of an unprocessed seismic trace at a source-to-receiver offset, generating several models of unprocessed seismic traces for other source-to-receiver offsets corresponding to those recorded for the seismic data, combining said models for said source-to-receiver offsets to develop an unprocessed model gather, and comparing variations in the amplitude versus offset of unprocessed seismic data to variations in amplitude versus offset of said unprocessed model gather for corresponding source-to-receiver offsets.

34. A method of affecting an enhanced amplitude-versus-offset analysis on recorded seismic data wherein the seismic data and modeled data are processed and compared at any step therein, said method comprising generating a model of an unprocessed seismic trace for a source-to-receiver offset, generating a plurality of additional models of unprocessed seismic traces for other source-to-receiver offsets corresponding to those recorded for the recorded seismic data, combining said models for source-to-receiver offsets to develop an unprocessed model gather, processing said unprocessed model gather to produce a processed model gather, processing the recorded seismic data to produce processed seismic data, and comparing variations in the amplitude versus offset of said processed seismic data to variations in amplitude versus offset of said processed model gather.

35. A method in accordance with claim 34, wherein said processing of both said unprocessed model gather and said processing of the recorded seismic data, includes deconvolving said unprocessed model gather with model seismic wavelets for corresponding source-to-receiver offsets to produce a processed model gather, and deconvolving the recorded seismic data with said model seismic wavelets for corresponding source-to-receiver offsets to produce a processed seismic gather.

36. A method in accordance with claim 35, wherein said processing of both said unprocessed model gather and the recorded seismic data incorporates an average amplitude correction factor method, said method comprising determining an average amplitude spectrum of a model seismic wavelet for one source-to-receiver offset for a frequency band, determining average amplitude for each of said source-to-receiver offsets for said frequency band, calculating the average amplitude correction factor for each source-to-receiver offset from the ratios of said average amplitude spectrum to said average amplitudes, multiplying said average amplitude correction factors by said unprocessed model gather at corresponding source-to-receiver offsets, and multiplying said average amplitude correction factors by the recorded seismic data at corresponding source-to-receiver offsets.

37. A method in accordance with claim 34, wherein said processing of both said unprocessed model gather and the recorded seismic data incorporates a zero phase filtering method, said method comprising determining an amplitude spectrum for said model seismic wavelet for a source-to-receiver offset corresponding to one in the recorded seismic data and frequency band, determining an amplitude spectrum for each model seismic wavelet at each source-to-receiver offset corresponding to those in the recorded seismic data for said frequency band to determine overall amplitude spectra, calculating zero phase filters from the ratio of the amplitude spectrum to said amplitude spectra, and multiplying the zero phase filters by the unprocessed model gather and the recorded seismic data in said frequency band at the corresponding source-to-receiver offsets.

38. A prestack deconvolution method of processing seismic data, said method comprising determining values for factors corresponding to the source, the medium that would be transversed by a seismic wavelet, the target, and the receiving system, said factors including, source-to-receiver offset, radiated energy density, directivity, capture area, target reflection coefficient, divergence, and loss factor, combining said values for said factors to produce a model amplitude spectrum of said seismic wavelet, determining phase components of an electromotive force ($\phi_\epsilon(f)$) generated by said seismic wavelet, deriving the value of any phase contributions of load and receiver array impedances, combining said components of said electromotive force and said load and receiver array impedances to produce a model phase spectrum of a seismic wavelet, combining said model amplitude spectrum with said model phase spectrum to produce a model frequency spectrum for a model seismic wavelet for said source-to-receiver offset, and deconvolving a seismic trace for said source-to-receiver offset by said model seismic wavelet.

39. An average-amplitude correction factor method of processing seismic data, which comprises determining values for factors for a source-to-receiver offset in a frequency band, corresponding to the source, the medium that would be transversed by a seismic wavelet, and the receiving system, said factors including directivity, capture area, divergence, and loss factor, combining said values for said factors to produce a first average amplitude for said source-to-receiver offset for said frequency band, generating average amplitudes for each source-to-receiver offset in said frequency band, calculating average amplitude correction factors as the ratios of said average amplitudes to said first average amplitude, and multiplying seismic traces at said source-to-receiver offsets by said average amplitude correction factors at the respective offsets.

40. A zero phase filtering method of processing recorded seismic data, which comprises determining an amplitude spectrum for a model seismic wavelet for a source-to-receiver offset corresponding to one in the recorded seismic data and frequency band, generating an amplitude spectrum for each model seismic wavelet at each source-to-receiver offset corresponding to those in the recorded seismic data for said frequency band to determine amplitude spectra, calculating the zero phase filters from the ratios of said amplitude spectra to said amplitude spectrum, and multiplying the zero phase filters by seismic traces in said frequency band at respective source-to-receiver offsets.

41. A prestack deconvolution method of processing a model seismic trace, which comprises determining values for factors corresponding to the source, the medium that would be transversed by a seismic wavelet, the target, and the receiving system, said factors including, source-to-receiver offset, radiated energy density, directivity, capture area, target reflection coefficient, divergence and loss factor, combining said values for factors to produce a model amplitude spectrum of said seismic wavelet, determining phase components of an electromotive force ($\phi_\epsilon(f)$) generated by said seismic wavelet deriving the value of any phase contributions of load and receiver array impedances, combining said components of said electromotive force and said load and receiver array impedances to produce a model phase spectrum of a seismic wavelet, combining said model amplitude spectrum with said model phase spectrum to produce a model frequency spectrum for a model seismic wavelet, determining a time-reflection sequence developed from a parallel layered subsurface, convolving said model seismic wavelet with said time reflection sequence to develop a model seismic trace for said source-to-receiver offset, and deconvolving said model trace by said model seismic wavelet.

42. An average-amplitude correction factor method of processing a model seismic gather, which comprises determining values for factors for a source-to-receiver offset in a frequency band, corresponding to the source, the medium that would be transversed by a seismic wavelet, and the receiving system, said factors including directivity, capture area, divergence, and loss factor, combining said values for said factors to produce a first average amplitude for said source-to-receiver offset for said frequency band, generating an average amplitude for each source-to-receiver offset in said frequency band, calculating average amplitude correction factors as the ratios of said average amplitudes to said first average amplitude, and multiplying the average amplitude correction factors by seismic traces at respective source-to-receiver offsets.

43. A zero phase filtering method of processing a model seismic gather, which comprises determining an amplitude spectrum for a model seismic wavelet for a source-to-receiver offset and frequency band, generating an amplitude spectrum for each model seismic wavelet at each source-to-receiver offset for said frequency band to determine amplitude spectra, calculating zero phase filters from the ratios of said amplitude spectra to said amplitude spectrum, and multiplying the zero phase filters by model traces in the frequency domain at respective source-to-receiver offsets.

44. A method creating a stacked modeled seismic wavelet that simultaneously incorporates therein a multiplicative effect of source-to-receiver factors which would affect a seismic wavelet that issues from a seismic source, traverses a medium, is reflected from a target, and is received by a receiving system, said method comprising generating models of unprocessed seismic wavelets for source-to-receiver offsets, and processing said models of unprocessed seismic wavelets at different source-to-receiver offsets into a model stacked wavelet.

45. A post stack deconvolution method of processing stacked seismic data, which comprises generating models of unprocessed seismic wavelets for source-to-receiver offsets, processing said models of unprocessed seismic wavelets at different source-to-receiver offsets into a model stacked wavelet, and deconvolving stacked seismic data by said model stacked wavelet.

46. A method of deriving a seismic data gathering system frequency response required to produce requisite received electrical energy density of a seismic wavelet issued from a source, transverses a medium, is reflected from a target, and is received by a receiving system by utilizing the following seismic range equation:

$$E_r(f) = \frac{E(f)D(\theta_s, \phi_s, f)A_c(\theta_H, \phi_H, f)R_T^2}{D_v L(f)}$$

having seven elements
1) $E(f)$ is the radiated energy density from a source at frequency, f;
2) $D(\theta_s,\phi_s,f)$ is source directivity along the $\theta_s$, $\phi_s$ direction;
3) $A_c(\theta_H,\phi_H,f)$ is the capture area of a receiving system for incident angle $\theta_H,\phi_H$;
4) $R_T$ is the P-wave reflection coefficient of a target interface;
5) $D_v$ is the divergence;
6) $L(f)$ is representative of the losses associated with seismic data gathering; and
7) $E_r(f)$ is the received energy density at a receiver array, said method comprising selecting a system requisite received electrical energy density of the seismic wavelet returned from subsurface, determining physical subsurface characteristics, for subsurface layers (i) transversed by the seismic wavelet, including P-wave velocity ($\alpha_i$), S-wave velocity ($\beta_i$), density ($\rho_i$), and thickness ($h_i$), assuming the seismic wavelet path begins at the source of a seismic data gathering system, at frequency (f), through the medium at ray angle ($\theta_s$) with respect to the normal to the surface and at corresponding ray angles ($\theta_i$) through subsurface layers, to the predetermined target bed at depth (d) through said subsurface layers to a receiving system of the seismic data gathering system, determining the target's power reflection coefficient ($R_T^2$), calculating divergence ($D_v$) for a given offset, calculating the loss factor ($L(f)$) associated with the subsurface layers, and determining a system frequency response as a function of radiated energy density from the source, source directivity, and capture area from the product of received electrical energy density ($E_r(f)$), the divergence ($D_v$), and the loss factor divided by the square of the target's power reflection coefficient.

47. A method in accordance with claim 46, wherein said target's power reflection coefficient is derived from the said ray angle ($\theta_i$), said seismic velocity ($\alpha_i,\alpha_{i+1},\beta_i$ and $\beta_{i+1}$), and said density ($\rho_i$ and $\rho_{i+1}$) at layers at the interface.

48. A method in accordance with claim 46, wherein said divergence is derived from said thickness ($h_i$) of the subsurface layer transversed by the seismic wavelet, said ray angle ($\theta_i$) in each subsurface layer, and offset distance X.

49. A method in accordance with claim 46, wherein said loss factor includes transmission loss ($L_t$).

50. A method in accordance with claim 49, wherein said transmission loss ($L_t$) is a loss associated with crossing the interfaces twice and is derived from transmission coefficients associated with the corresponding subsurface layers traversed ($T_{i'i+1} T_{i+1'i}$).

51. A method in accordance with claim 50, wherein said interface include the following interfaces: solid-to-solid, fluid-to-solid, and solid-to-fluid.

52. A method in accordance with claim 46, wherein said loss factor includes Q-loss ($L_Q(f)$).

53. A method in accordance with claim 52, wherein said Q-loss is derived from an attenuation constant ($Q_i$) for each transversed subsurface layer, said P-wave velocity ($\alpha_i$) of each transversed subsurface layer, said width of each transversed subsurface layer ($h_i$), said frequency (f), and said ray angle ($\theta_i$).

54. A method in accordance with claim 53, wherein said attenuation constant is estimated by finding an effective attenuation constant (Q) down to said target depth from existing seismic data in the area.

55. A method in accordance with claim 46, wherein said loss factor includes interbed multiple loss $L_{ib}(f)$.

56. A method in accordance with claim 46, wherein said radiated energy density E(f) is derived from a number of source array element (N), said number being at least one, said frequency (f), said seismic velocity of first layer traversed ($\alpha_1$), said density of the first layer transversed ($\rho_1$), and an illumination factor.

57. A method in accordance with claim 56, wherein said illumination factor ($I_n(f)$) is derived from an amplitude spectrum ($A_n(f)$) of the radiated seismic wavelet, a value of any firing delay ($\delta_n$), and said frequency (f).

58. A method in accordance with claim 46, wherein said source directivity is derived from the ratio of a radiated energy density per unit solid angle radiated in particular direction ($\theta_s,\phi_s$) to radiated energy density E(f).

59. A method in accordance with claim 46, wherein said capture area ($A_c(\theta_H,\phi_H,f)$) is determined from the multiplication of capture area along the acoustic axis and a transmitting pattern of a receiving system.

60. A method in accordance with claim 59, wherein said capture area along the acoustic axis, said axis being normal to the surface, is derived from receiving array sensitivity $S_H(f)$, value of any load and receiving array impedances ($Z_L(f)$ and $Z_H(f)$), said density of the first transversed layer, said P-wave velocity of the first transversed layer, and array depth.

61. A method in accordance with claim 59, wherein said transmitting pattern is defined by the ratio of a receiving array directivity $D(\theta_H,\phi_H,f)$ along the incident ray direction to the directivity of the receiving array along the acoustic axis ($D(O,\phi_H,f)$), said axis being normal to the surface.

62. A method in accordance with claim 46, and including a method for deriving a seismic data gathering system source frequency response required to produce a requisite received electrical energy density of a seismic wavelet issued from a source, transverses a medium, is reflected from a target, and is received by a receiving system for specified receiver characteristics, said method comprising specifying a receiving system including the value of any receiving array and load impedances ($Z_H(f)$ and $Z_L(f)$), receiving array sensitivity ($S_H(f)$), and receiving array depth ($d_H$), calculating said capture are ($A_c(\theta_H,\phi_H,f)$) from the product of the capture area along the acoustic axis and transmitting pattern of receiving array, and dividing said system response by said capture area to determine the seismic data gathering system source frequency response as a function of source directivity and radiated energy density.

63. A method in accordance with claim 46, and including a method for deriving a seismic data gathering system receiver frequency response required to produce a requisite received electrical energy density of a seismic wavelet issued from a source, transverses a medium, is reflected from a target, and is received by a receiving system, for specified source characteristics, which comprises specifying a source including a frequency spectrum of the outgoing waveforms from a number of individual source array elements, said number being at least one, a position of the source array elements when the number of said elements is greater than one, and a value of any firing delays associated with source array elements ($\delta_n$), calculating said radiated energy density $E(f)$, calculating said source directivity from the ratio of said radiated energy density per unit solid angle radiated in a particular direction ($\theta_s,\phi_s$) to said radiated energy density $E(f)$, and dividing said system frequency response by said source directivity and said radiated energy density to determine the seismic data gathering system receiver frequency response.

64. A method of modeling an amplitude spectrum of a seismic wavelet that issues from a seismic source, traverses a medium, is reflected from a target, and is received by a receiving system, said method comprising determining values for the factors corresponding to the source, the medium, the target, and the receiving system that would affect the seismic wavelet, and combining said values for said factors multiplicatively to produce a model amplitude spectrum of the seismic wavelet.

65. A method of modeling a frequency spectrum of a seismic wavelet that issues from a seismic source, traverses a medium, is reflected from a target, and is received by a receiving system, said method comprising determining values for factors corresponding to the source, the medium, the target, and the receiving system that would affect a seismic wavelet, combining said values for said factors multiplicatively to produce a model amplitude spectrum of the seismic wavelet, determining phase components of an electromotive force ($\phi_\epsilon(f)$) generated by the seismic wavelet, deriving the value of any phase components of load and receiving array impedances, combining said components of said electromotive force and said load and receiving array impedances to produce a model phase spectrum of the seismic wavelet, and combining said model amplitude spectrum with said model phase spectrum to produce a model frequency spectrum of the seismic wavelet.

66. A method of interpreting stacked seismic traces derived from recorded seismic data, said method comprising generating a model of an unprocessed seismic trace at a source-to-receiver offset corresponding to one in the recorded seismic data, generating several models of unprocessed seismic traces for different source-to-receiver offsets corresponding to those in the recorded seismic data, combining said models for said source-to-receiver offsets to develop an unprocessed model gather, processing said unprocessed model gather into a stacked model trace, and comparing variations in stacked seismic trace to variations in said stacked model trace.

67. A method of interpreting stacked seismic data derived from recorded seismic data wherein seismic data and modeled data are processed, stacked, and compared, said method comprising generating a model of an unprocessed seismic trace for a source-to-receiver offset corresponding to one in the recorded seismic data, generating a plurality of additional models of unprocessed seismic traces for different source-to-receiver offsets corresponding to those in the recorded seismic data, combining said models to develop an unprocessed model gather, processing said unprocessed model gather to produce a processed model gather, processing the recorded seismic data to produce processed seismic data, processing said processed model gather into a stacked model trace, processing said processed seismic data into a stacked seismic trace, and comparing said stacked seismic trace to said stacked model trace.

68. A method of interpreting stacked seismic data derived from recorded seismic data wherein seismic data and modeled data are stacked, processed, and compared at any step therein, said method comprising generating a model of an unprocessed seismic trace for a source-to-receiver offset corresponding to one in the recorded seismic data, generating a plurality of additional models of unprocessed seismic traces for different source-to-receiver offsets corresponding to those in the recorded seismic data, combining said models to develop an unprocessed model gather, processing said unprocessed model gather into an unprocessed stacked model trace, processing the unprocessed recorded seismic data into an unprocessed stacked seismic trace, processing said unprocessed model stacked trace to produce a processed model stacked trace, processing said unprocessed stacked seismic data to produce model stacked data, and comparing variations of said processed stacked seismic data to variations in said processed model stacked trace.

69. A method in accordance with claim 68 wherein said processing of both said unprocessed stacked model trace and unprocessed stacked seismic data incorporates a post stack deconvolution method, said method comprising generating models of unprocessed seismic wavelets for source-to-receiver offsets corresponding to those recorded for the recorded seismic data, processing said models of unprocessed seismic wavelets into a model stacked wavelet, deconvolving said unprocessed model stacked trace by said model stacked wavelet, and deconvolving said unprocessed stacked seismic data by said model stacked wavelet.

* * * * *